United States Patent
Bruening et al.

(10) Patent No.: US 7,603,704 B2
(45) Date of Patent: Oct. 13, 2009

(54) SECURE EXECUTION OF A COMPUTER PROGRAM USING A CODE CACHE

(75) Inventors: Derek L. Bruening, Cambridge, MA (US); Vladimir L. Kiriansky, Mountain View, CA (US); Saman P. Amarasinghe, Waltham, MS (US)

(73) Assignee: Massachusetts Institute of Technology, Cambridge, MA (US)

( * ) Notice: Subject to any disclaimer, the term of this patent is extended or adjusted under 35 U.S.C. 154(b) by 338 days.

(21) Appl. No.: 10/739,499

(22) Filed: Dec. 18, 2003

(65) Prior Publication Data

US 2005/0010804 A1 Jan. 13, 2005

Related U.S. Application Data

(60) Provisional application No. 60/435,304, filed on Dec. 19, 2002.

(51) Int. Cl.
*G06F 11/00* (2006.01)
(52) U.S. Cl. .................................. 726/22; 726/23
(58) Field of Classification Search ............... 726/22, 726/23, 24, 25, 1; 711/163
See application file for complete search history.

(56) References Cited

U.S. PATENT DOCUMENTS

| 5,193,180 | A | 3/1993 | Hastings | |
|---|---|---|---|---|
| 5,974,549 | A * | 10/1999 | Golan | .................. 726/23 |
| 6,185,669 | B1 | 2/2001 | Hsu | |
| 6,189,141 | B1 | 2/2001 | Benitez | |
| 6,199,202 | B1 | 3/2001 | Coutant | |
| 6,205,545 | B1 | 3/2001 | Shah | |
| 6,219,832 | B1 | 4/2001 | Buzbee | |
| 6,223,339 | B1 | 4/2001 | Shah | |
| 6,237,065 | B1 | 5/2001 | Banerjia et al. | |
| 6,243,668 | B1 | 6/2001 | Le | |
| 6,247,172 | B1 | 6/2001 | Dunn | |
| 6,255,744 | B1 | 7/2001 | Shih | |
| 6,275,938 | B1 * | 8/2001 | Bond et al. | ................... 726/23 |
| 6,275,981 | B1 | 8/2001 | Buzbee | |
| 6,279,081 | B1 | 8/2001 | Spencer | |
| 6,295,644 | B1 | 9/2001 | Hsu | |
| 6,301,699 | B1 | 10/2001 | Hollander et al. | |
| 6,314,560 | B1 | 11/2001 | Dunn | |
| 6,317,870 | B1 | 11/2001 | Mattson, Jr. | |
| 6,327,704 | B1 | 12/2001 | Mattson, Jr. | |
| 6,351,844 | B1 | 2/2002 | Bala | |

(Continued)

OTHER PUBLICATIONS

Baratloo, et al., "Transparent Run-Time Defense Against Stack Smashing Attacks," Proceedings of the Usenix Annual Technical Conference, Jun. 2000.

(Continued)

*Primary Examiner*—Nasser G Moazzami
*Assistant Examiner*—Carlton V Johnson

(57) ABSTRACT

Hijacking of an application is prevented by monitoring control flow transfers during program execution in order to enforce a security policy. At least three basic techniques are used. The first technique, Restricted Code Origins (RCO), can restrict execution privileges on the basis of the origins of instruction executed. This distinction can ensure that malicious code masquerading as data is never executed, thwarting a large class of security attacks. The second technique, Restricted Control Transfers (RCT), can restrict control transfers based on instruction type, source, and target. The third technique, Un-Circumventable Sandboxing (UCS), guarantees that sandboxing checks around any program operation will never be bypassed.

39 Claims, 33 Drawing Sheets

U.S. PATENT DOCUMENTS

| | | | |
|---|---|---|---|
| 6,374,331 | B1 | 4/2002 | Janakiraman |
| 6,377,287 | B1 | 4/2002 | Hao |
| 6,378,029 | B1 | 4/2002 | Venkitakrishnan |
| 6,412,071 | B1 | 6/2002 | Hollander et al. |
| 6,418,530 | B2 | 7/2002 | Hsu |
| 6,430,675 | B1 | 8/2002 | Hsu |
| 6,430,741 | B1 | 8/2002 | Mattson, Jr. |
| 6,453,411 | B1 | 9/2002 | Hsu |
| 6,470,492 | B2 | 10/2002 | Bala et al. |
| 6,587,888 | B1 | 7/2003 | Chieu et al. |
| 6,823,460 | B1 | 11/2004 | Hollander et al. |
| 6,983,463 | B1 | 1/2006 | Hunt |
| 7,013,456 | B1* | 3/2006 | Van Dyke et al. ........... 717/130 |
| 7,124,407 | B1* | 10/2006 | Wallman .................... 717/154 |
| 7,213,153 | B2 | 5/2007 | Hollander |
| 2003/0140245 | A1* | 7/2003 | Dahan et al. ................ 713/200 |

OTHER PUBLICATIONS

Bruening, et al., "Design and Implementation of a Dymanic Optimization Framework for Windows," 4th Workshop on Feedback-Directed and Dymamic Optimization, Austin, Texas, Dec. 1, 2001.

Cowan, et al., "StackGuard: Automatic Adaptive Detection and Prevention of Buffer-Overflow Attacks," In Proc. 7th Usenix Security Symposium, pp. 63-78, San Antonio, Texas, Jan. 1998.

Erlingsson, et al., "Sasi Enforcement of Security Policies: A Retrospective", Proc. of the New Security Paradigms Workshop, Ontario, Canada, 22-24, Sep. 1999.

Frantzen, et al., "StackGhost: Hardware Facilitated Stack Protection," In Proc. 10th Usenix Security Symposium, Washington, DC, Aug. 2001.

Ko, et al., "Detecting and Countering System Intrusions Using Software Wrappers," In Proc. 9th Usenix Security Symposium, Denver, Colorado, Aug. 2000.

Schneider, "Enforceable Security Policies," ACM Transactions on Information and System Security, vol. 3. No. 1, pp. 30-50, Feb. 2000.

Scott, et al., "Strata: A Software Dynamic Translation Infrastructure," Workshop on Binary Translation Infrastructure, Sep. 8, 2001.

Wagner, et al., "Intrusion Detection via Static Analysis," In IEEE Symposium on Security and Privacy, 2001.

Bala, et al., "Dynamo: A Transparent Dynamic Optimization System," Proc. of the ACM Sigplan Conf., PLDI, Jun. 2000.

Chen, et al., "Mojo: A Dynamic Optimization System," In 3rd ACM Workshop on Feedback-Directed and Dynamic Optimization, Dec. 2000.

Cmelik, et al., "Shade: A Fast Instruction-Set Simulator for Execution Profiling," Sigmetrics, 1994.

Hastings, et al., "Purify: Fast Detection of Memory Leaks and Access Errors," Proceedings of the Winter Usenix Conference, pp. 125-136, Jan. 1992.

Hollingsworth, et al., "Dynamic Program Instrumentation for Scalable Performance Tools," Scalable High Performance Computing Confernce, Knoxville, May 1994.

Larus, et al., "Rewriting Executable Files to Measure Program Behavior," Software Practice and Experience, vol. 24(2), pp. 197-218, Mar. 25, 1992.

Ung, et al., "Machine-Adaptable Dynamic Binary Translation," Proc. of the ACM Sigplan Workshop on Dynamic and Adaptive Compilation and Optimization, Jan. 2000.

Das, "Unification-based Pointer Analysis with Directional Assignments," In Proc ACM Sigplan Conf on Programming Language Design and Implementation, Vancouver, BC, Canada, Jun. 2000.

Kiriansky, et al., "Secure Execution Via Program Shepherding," Laboratory for Computer Science, Massachusetts Institute of Technology, Cambridge, MA, no date.

U.S. Appl. No. 09/874,170, filed Jun. 4, 2001, Vasanth Bala.
U.S. Appl. No. 09/924,260, filed Aug. 8, 2001, Duesterwald.
U.S. Appl. No. 09/989,180, filed Nov. 21, 2001, Duesterwald.
U.S. Appl. No. 09/992,642, Nov. 13, 2001, Freudenberger.
U.S. Appl. No. 09/995,774, filed Nov. 29, 2001, Desoli.
U.S. Appl. No. 09/995,775, filed Nov. 29, 2001, Duesterwald.
U.S. Appl. No. 09/997,062, filed Nov. 29, 2001, Duesterwald.
U.S. Appl. No. 09/997,163, filed Nov. 29, 2001, Desoli.
U.S. Appl. No. 09/997,454, filed Nov. 29, 2001, Mateev.
U.S. Appl. No. 09/999,451, filed Nov. 15, 2001, Desoli.
U.S. Appl. No. 10/100,874, filed Mar. 19, 2002, Desoli.
U.S. Appl. No. 10/104,084, filed Mar. 22, 2002, Desoli.
U.S. Appl. No. 10/118,881, filed Apr. 9, 2002, Deusterwald.
U.S. Appl. No. 10/126,647, filed Apr. 19, 2002, Fisher.
U.S. Appl. No. 10/198,839, filed Jul. 19, 2002, Desoli.
U.S. Appl. No. 10/212,275, filed Aug. 5, 2002, Desoli.

Kiriansky et al., "Secure Execution Via Program Shepherding," Proc. of the 11th Usenix Security Symp., Aug. 5-9, 2002.

Intel Pentium 4 and Intel Xeon Processor Optimization—Reference Manual, Intel Corporation, 1999-2001.

Document titled "pageexec00old," http://pax.grsecurity.net/docs/pageexec.old.txt, Nov. 2000.

Document titled "pax01pageexec," http://pax.grsecurity.net/docs/pageexec.txt, Mar. 15, 2003.

Document titled "zenith01lpd," www.securityfocus.com/bid/3103/discuss, Jul. 26, 2001.

"A 'stack smashing' technique protection tool for Linux," vendicator-stackshield-info, http://angelfire.com/sk/stackshield/ info.html, Jan. 2000.

"Defeating Solar Designer's Non-executable Stack Patch," www.securityfocus.com/archive/1/8470, Jan. 30, 1998.

Newsham, "Format String Attacks," Guardent, Inc, Sep. 2000.

"Linux kernel patch from the Openwall Project," www.openwall.com/linux/readme.shtml, Oct. 9, 2001.

"Tool Interface Standard (TIS) Executable and Linking Format (ELF) Specification, Version 1.2," TIS Committee, May 1995.

Aleph One, "Smashing The Stack for Fun and Profit," aleph96p49-14, Phrack Magazine, 1996.

Nergal, "The advanced return into lib(c) exploits: PAX case study," nerga101p58-0x04, Phrack Magazine, www.phrack. org, Issue 58(4), Dec. 2001.

Kaempf, "Vudo-An Object Superstitiously Believed to Embody Magical Powers," kaempf01p57-0x08, Phrack Magazine, 2001.

Bulba et al., "Bypassing Stackguard and Stackshield," Phrack Magazine, vol. 10, Issue 56, May 1, 2000.

Deaver et al., "Wiggins/Redstone: An On-line Program Specializer," www.hotchips.org/archives/hc11/3_Tue/hc99.s6.2.Deaver.pdf, 1999.

Ko et al., "Detecting and Countering System Intrusions Using Software Wrappers," Proc. of the 9th Usenix Security Symp., Aug. 14-17, 2000.

Chen et al. "Mojo: A Dynamic Optimization System," 4th ACM Workshop on feedback-directed and dynamic optimization (FDDO-4), pp. 81-90, Dec. 2000.

Bala et al., "Dynamo: A Transparent Dynamic Optimization System," Proc. of the ACM Sigplan 2000 Conf. on Programming Language Design and Implementation, 2000.

Arnold et al., "Adaptive Optimization in the Jalapeno JVM," ACM Sigplan Conf. On Object-Oriented Programming, Systems, Languages, and Applications, Oct. 15-19, 2000.

Cowan et al., "FormatGuard: Automatic Protection From printf Format String Vulnerabilities," Proc. of the 10th Usenix Security Symp., Aug. 2001.

Frantzen et al., "StackGhost: Hardware Facilitated Stack Protection," Proc. of the 10th Usenix Security Symp., Aug. 2001.

Bruening et al., "Design and Implementation of a Dynamic Optimization Framework for Windows," 4th ACM Workshop on feedback-directed and dynamic optimization (FDDO-4). Dec. 2001.

Rotenberg et al.,, "Trace Cache: a Low Latency Approach to High Bandwidth Instruction Fetching," Proc. of the 29th Annual ACM/IEEE Int. Symp. on Microarchitecture, Nov. 1996.

Goldberg et al., "A Secure Environment for Untrusted Helper Applications," Proc. of the 1996 Usenix Security Symposium, 1996.

Deutsch et al., "Efficient Implementation of the Smalltalk-80 System," 11th Annual ACM Symp. on Principles of Programming Languages, Jan. 1984.

Cowan et al., "StackGuard: Automatic Adaptive Detection and Prevention of Buffer Overflow Attacks," Proc. of the 7th Usenix Security Symp., Jan. 26-29, 1998.

Engler et al., "Exokernel: An Operating System Architecture for Application-Level Resource Management," Proc. of the 15th ACM Symp. on Operating Systems Principles, 1995.

J. Smith et al., "Virtual Machines—Versatile Platforms for Systems and Processes," Elsevier Inc., 2005, p. 55.

M. Pietrek, APISPY32; 1995, downloaded from www.wheaty.net.

M. Pietrek, INTRCPT, 1995, downloaded from www.wheaty.net.

Hunt et al., "Detours—Binary Interception of Win32 Functions," Proc. of the 3rd Usenix Windows NT Symp., Seattle, WA, Jul. 1999.

Butler et al., "Bypassing 3rd Party Windows Buffer Overflow Protection," Phrack Inc., Issue 62, Jul. 2004.

Definition of "basic block," printed from www.answers.com/topic/basic-block, on Oct. 2, 2007.

* cited by examiner

Results of Chosen Policy

| Attack Type | | | | Restricted Code Origins | Restricted Control Transfers | Uncircumventable Sandboxing |
|---|---|---|---|---|---|---|
| Injected Code | | | | STOPPED | | |
| Chained Calls | | | | | STOPPED | HINDERED |
| Return | Not Imported | | | | HINDERED | HINDERED |
| | Imported | has entry info | mid-function | | STOPPED | |
| | | | function-entry | | | HINDERED |
| | | no entry info | | | STOPPED | |
| Call or Jump | Inter Module | | | | | HINDERED |
| | Intra Module | | | | | HINDERED |
| Other Transfer | | | | | | |
| Existing Code | | | | | | |

FIGURE 2

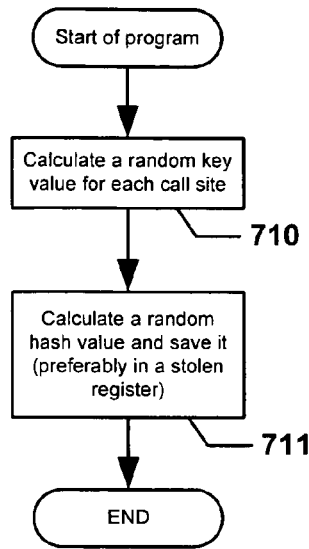
FIGURE 25A
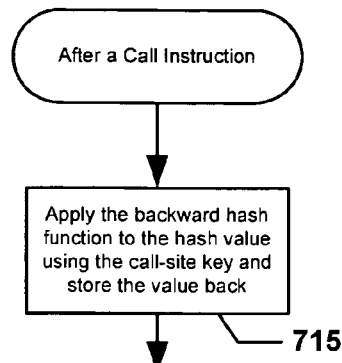
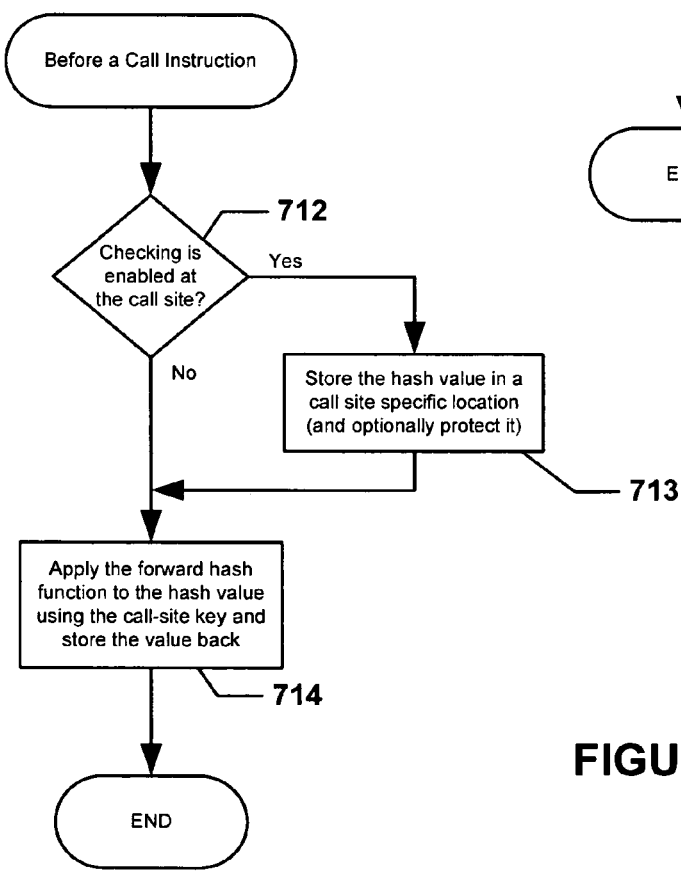
FIGURE 25C
FIGURE 25
FIGURE 25B

SECURE EXECUTION OF A COMPUTER PROGRAM USING A CODE CACHE

This application claims the benefit of provisional patent application Ser. No. 60/435,304 filed Dec. 19, 2002; the disclosure of which is incorporated herein by reference in its entirety.

STATEMENT REGARDING FEDERALLY SPONSORED RESEARCH

This invention was made with government support under Contract No. F29601-01-2-0166 awarded by the Air Force. The government has certain rights in the invention.

CROSS REFERENCE TO RELATED APPLICATIONS

This Application is related to U.S. patent application Ser. No. 10/740,063, titled "Secure Execution Of A Computer Program," by Vladimir L. Kiriansky, Derek L. Bruening, and Saman P. Amarasinghe, filed Dec. 18, 2003, the same day as the present application, and published as U.S. Pub. No. 2004/0133777 on Jul. 8, 2004, incorporated herein by reference in its entirety.

BACKGROUND OF THE INVENTION

1. Field of the Invention

The present invention relates generally to securing computer systems.

2. Description of the Related Art

Remote exploitation of program vulnerabilities poses a very serious threat to modem information infrastructures. Because of the monoculture of modem computer software, a single vulnerability in a critical piece of software can make millions of computers susceptible to attacks. These susceptible computers are exploited by rapid, automatic, self-propagating programs, or worms, that gain control over a large number of them.

The lifecycle of a typical attack can be divided into three phases. In the first phase ("the enter phase") an attack enters the computer system by taking advantage of a vulnerability or bug such as a buffer overflow or a format string vulnerability in a privileged program. These vulnerabilities allow an attack to send malformed data from a remote host that will result in an insertion of data or modification of certain memory locations in the address space of the program. By modifying key program data such as the return addresses in the stack or jump tables in the heap, the attack moves to the next phase ("hijacking phase") by hijacking the control from the program. After the program is hijacked, instructions carried out on behalf of the program are in fact the instructions dictated by the attack. Now the attack enters the final phase ("the compromise phase") where it executes a sequence of instructions that compromises the computer. This can lead to self propagation of the worm and infection of other computers, and destruction or disclosure of the information on the local machine.

Traditional forms of protection against these attacks have focused on stopping them in either the enter phase or the compromise phase. In attempting to stop an attack in the enter phase, all the input strings are scrutinized in order to identify possible attacks. Although known exploits can be stopped using signatures, that does not stop previously unknown or "zero day" attacks. It is very difficult to prevent all exploits that allow address overwrites, as they are as varied as program bugs themselves. Furthermore, there are no effective techniques that can stop malevolent writes to memory containing program addresses in arbitrary programs, because addresses are stored in many different places and are legitimately manipulated by the application, compiler, linker and loader.

The second traditional approach is to stop an attack in the compromise phase. These forms of policy enforcement use limited types of target system events that they can monitor, such as API or system calls. See Golan [U.S. Pat. No. 5,974,549] or Hollander [U.S. Pat. No. 6,412,071] for examples of these. Such a coarse-grained approach cannot accurately monitor improper control transfers of the above type and are known to produce many false positives.

Therefore, a need exists in the industry to address the aforementioned deficiencies and inadequacies.

SUMMARY OF THE INVENTION

The present invention, roughly described, pertains to securing computing systems in order to prevent security attacks that are based upon taking control of a computer program.

Rather than attempting to stop an attack during the enter or the compromise phase, one embodiment of the present invention prevents the hijack of an application—the transfer of control to malevolent code. This is achieved by monitoring control flow transfers during program execution in order to enforce a security policy. Most modem attacks violate a security policy, satisfied by the normal execution of the application, in order to hijack the application. One embodiment of the present invention provides at least three basic techniques as building blocks for security policies. The first technique, Restricted Code Origins (RCO), can restrict execution privileges on the basis of the origins of the instructions. This distinction can ensure that malicious code masquerading as data is never executed, thwarting a large class of security attacks. The second technique, Restricted Control Transfers (RCT), can restrict control transfers based on instruction type, source, and/or target. The final technique, Un-Circumventable Sandboxing (UCS), guarantees that sandboxing checks around any program operation will never be bypassed.

One embodiment of the present invention includes monitoring control flow transfers for a program running on said computing system and enforcing a security policy on said control flow transfers. Another embodiment of the present invention includes monitoring control flow transfers for a program running on said computing system and using a code cache to enforce a security policy on said control flow transfers.

The present invention can be accomplished using hardware, software, or a combination of both hardware and software. The software used for the present invention is stored on one or more processor readable storage devices including hard disk drives, CD-ROMs, DVDs, optical disks, floppy disks, tape drives, RAM, ROM, flash memory or other suitable storage devices. In alternative embodiments, some or all of the software can be replaced by dedicated hardware including custom integrated circuits, gate arrays, FPGAs, PLDs, and special purpose processors. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 2 is a classification table of attacks and how a system protected by Program Shepherding is resilient to them.

FIG. 25 is a flow chart describing Restricted Control Transfer stack discipline enforcement rule.

DETAILED DESCRIPTION

Figure 1:
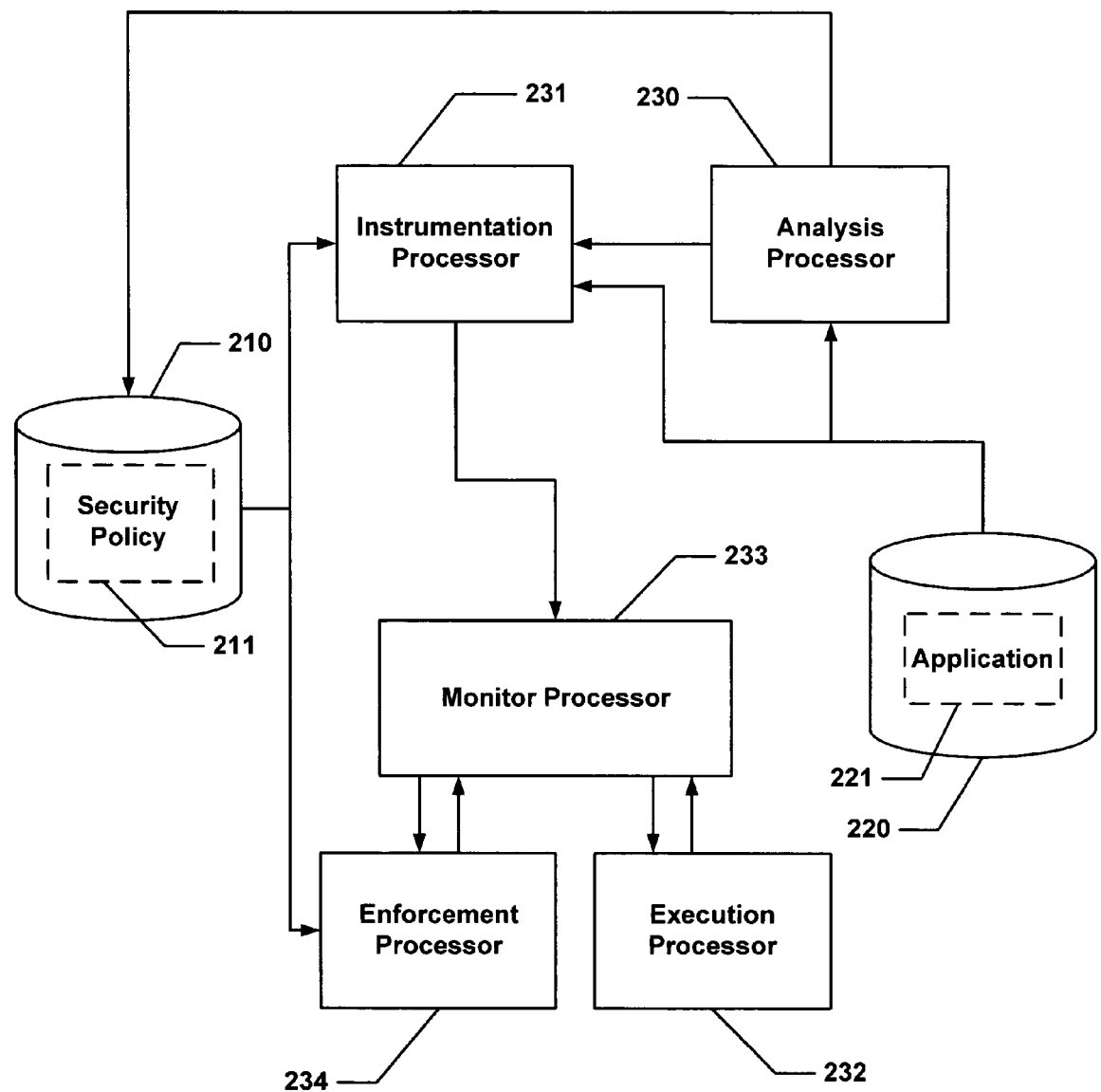
FIG. 1 is a block diagram of the abstract components of Program Shepherding.

The goal of most security attacks is to gain unauthorized access to a computer system by taking control of a vulnerable program. This is generally done by exploiting bugs that allow overwriting stored program addresses with pointers to malicious code. An attacker who gains control over a program can simply inject code to perform any operation that the overall application has permission to do. Hijacking trusted applications that are typically run with global permissions, such as login servers, mail transfer agents, and web servers, gives full access to machine resources.

Many attacks hijack the target program by performing actions that the target program was never intended to perform. In short, they violate the execution model followed by legitimate program runs. The execution model encompasses the Application Binary Interface (ABI), the calling convention and higher-level specifications from the program's source programming language. The model also incorporates components specific to the program, for example, which values a particular function pointer may take.

A program's execution model is invariably narrower than that imposed by the underlying hardware, because there is typically no efficient way in hardware to require that the specific rules of this execution model be adhered to. The result is that the execution model becomes, in practice, a convention rather than a strict set of rules. If these rules were enforced, and only program actions that the programmer intended were allowed, a majority of current security holes would be closed and most modern worm attacks would have been thwarted.

One aspect of the present invention includes Program Shepherding, which is an approach to preventing execution of malicious code by monitoring all control transfers to ensure that each control transfer satisfies a given security policy. Program Shepherding includes at least three techniques: Restricted Code Origins (RCO), Restricted Control Transfers (RCT), and Un-Circumventable Sandboxing (UCS).

Restricted Code Origins

In monitoring all code that is executed, each instruction's origins are checked against a security policy to see if it should be given execute privileges. This restriction can be used to ensure that malicious code masquerading as data is never executed, thwarting the largest class of current security attacks.

For example, code origins can be classified into these categories:

from the original image on disk and unmodified;

dynamically generated but unmodified since generation; and code that has been modified.

Finer distinctions, as well as other distinctions, can also be made.

Restricted Control Transfers

Program shepherding allows arbitrary restrictions to be placed on control transfers in an efficient manner. These restrictions can be based on the source and/or destination of a transfer as well as the type of transfer (direct or indirect call, return, jump, etc.). For example, the calling convention could be enforced by requiring that a return instruction only target the instruction after a call. Another example is forbidding execution of shared library code except through declared entry points. These restrictions can further prevent attackers from forming malicious code sequences from existing code. Different policies will obtain different suitable trade-offs between security, performance and applicability.

Un-Circumventable Sandboxing

Sandboxing generally refers to enforcing restrictions on a specific instruction or a sequence of instructions. This requires always executing a pre-defined prologue before all executions of the said instruction and/or a pre-defined epilogue afterwards. With the ability to monitor all transfers of control, program shepherding is able to guarantee that these sandboxing checks cannot be bypassed. Sandboxing without this guarantee can never provide true security—if an attack can gain control of the execution, it can jump straight to the sandboxed operation, bypassing the checks. In addition to allowing construction of arbitrary security policies, this guarantee is used to enforce the other two program shepherding techniques by protecting the shepherding system itself.

Dependencies

Program Shepherding provides a set of interrelated components that are mutually reinforcing. This means that any successful attack on Program Shepherding will need to solve many complex problems simultaneously.

For example, some embodiments require operating system-level write-protection on code that is determined to be trusted. RCO insures that only such trusted code is executed. Further, by adding semantic checks, UCS insures that such trusted execution is not subverted by the modification of page protection permissions. In turn, RCT insures that these inserted checks are not bypassed.

Enforceable Rules

Restricted code origins, restricted control transfers and un-circumventable sandboxing are used to enforce fundamental conventions that are followed by all programs, such as the application binary interface and the calling convention. The techniques can also be used to enforce best or safe programming practices that programs should adhere to, as well as adhering to program-specific behavior. These restrictions lead to a plethora of enforceable rules. In this section, some of the possible rules are described. However, this list is not exhaustive; the rules can be modified and other rules can also be used.

The first set of rules is on code origins. These rules dictate which instructions are considered valid instructions. If no active rule is satisfied for an instruction (see the Security Policy section), the instruction is suspected of being injected by an attack.

1. Execute an instruction if it is from a code page of the original application or library image on disk, where the page was unmodified during the execution of the application. One possible implementation of this restriction requires an unmodified page list to be maintained.
2. Execute an instruction if it was present when the application or library image was originally loaded from the disk and the instruction was never modified after load. One possible implementation of this restriction requires write-protecting all possible code pages after loading the application, and creating a protected shadow copy when the application attempts to modify a data value in a protected page. This requires maintaining several lists including a list of protected pages and a list of partially modified pages.
3. A relaxation of the first and second rule where a dynamically loaded library is considered valid, and the code pages loaded will be treated as valid code.
4. A simple restriction to 3 where the only valid load library call is when the dll name is derived from the static data space.

The above rules are sufficient for most regular applications. The next set of rules relaxes the code origins enforcement to allow dynamically generated code, as practiced in runtime systems for interpreted languages such as Java, Visual Basic, and the Microsoft Common Language Runtime framework.

5. Execute an instruction from regions application vendors have identified as dynamically generated code using a vendor specific API.
6. Execute an instruction from a page that is allocated as executable. This is important because some architectures such as IA-32 do not have the necessary hardware support to enforce an execution flag even though the operating system maintains this information.
7. Further restrict 6 where pages allocated as executable must be read-only.
8. Execute an instruction from pages once marked as writable but later marked as read-only and executable.
9. Further restrict 8 to only when the protection change to read-only and executable is performed by the loader or any other authorized code region.
10. A further restriction on 8 and 9 where pages have to be originally allocated as executable.
11. A further restriction to 6, 7, 8 and 9 where the system only allows execution of instructions from pages allocated to the heap and not the stack.
12. Execute an instruction if that instruction was part of a region that was explicitly flushed from the hardware instruction cache.
13. Further restrict 12 to only allow execution of instructions that were not modified after the flush from the hardware instruction cache.
14. Execute instructions of a block of code provided that the block of code does not contain system calls or only contains a limited subset of system calls.
15. Allow only certain sequences of dynamically generated instructions (for example, known trampolines) to be executed.
16. Execute an instruction from a heap region allocated by specific calls to memory allocation routines (for example, known allocation points that allocate buffers for dynamic code generation).
17. Allow execution of self modifying code.
18. Relax 7, 8, 9, 10, 11, 12, and/or 13 to allow the execution of modified instructions where only the immediate value of the instruction is changed.

The next sets of rules relate to restricting control transfers. If a matching active rule is found for a given source address, destination address and the type of instruction, the control transfer is considered valid. If no matching active rule is found, the control transfer is suspected of being instigated by an attack.

The first set describes how to restrict calls and jumps between and within a module. A module is defined as a unit of program code that is loaded in to the application's address space. A module can be the executable file, a dynamically linked library (DLL) or a single allocation region of dynamically generated code. Each module consists of groups of instructions or functions. Normally each function has a single entry point so that the other functions can invoke and execute the said function by transferring control to the entry point. However, it is possible to have multiple entry points for one function.
19. Allow control to be transferred between modules when the binding is provided in an interface list. In one embodiment, an entry of the interface list includes a source module name, source address offset within the module, the destination module name and the destination address offset within the module.
20. Allow control transfer between modules when the destination address was included in the import list of the source module. The import list of symbols, which is normally used by the loader to identify the external functions needed by the executable or the DLL, is included in most common binary formats.
21. Allow control transfer between modules when the destination address was included in the export list of the destination module. The export list of symbols, which is normally used by the loader to identify what functions of the executable or the DLL can be used by the other modules, is included in most common binary formats.
22. A combination that satisfies both 20 and 21.
23. Allow control transfer when the source or destination or both are explicitly identified as a known callback. Normally a callback is setup by passing an address of a function or an entry point to another module so that the other module can invoke the said function when needed.
24. Allow call (and jump) instructions from libraries to the program or other libraries.
25. Allow call (and jump) instructions between modules.
26. Allow control to be transferred when the binding is provided in an interface list.
27. Allow call instructions to known function entry points.
28. Allow direct call instructions. A control transfer is direct when the destination address is fixed or embedded within the instruction.
29. Allow indirect call instructions. A control transfer is indirect when the destination address is derived or read from the data memory or registers.
30. Allow direct (and indirect) jump instructions which include both conditional and unconditional jumps.
31. Restrict 28, 29, and/or 30 to allow only these cases where both the source and destination are within a single module.
32. Restrict 30 to only allow those cases when both the source and the destination are within a single function. The next set of rules restricts return instructions.
33. Allow returns if the return destination is preceded by a direct call instruction.
34. Allow returns if the return destination is preceded by an indirect call instruction.
35. Restrict 33 and/or 34 to allow only those cases when the source and destination are in the same module.
36. Allow returns if the return destination is preceded by a call instruction that was previously executed.
37. Allow returns if the return destination is preceded by a direct call instruction and the return instruction is in the function pointed to by that call.
38. Maintain a shadow stack of return addresses and then check if the return address indicated in the program stack matches that in the shadow stack. Another embodiment is to store the top section of the shadow stack in a rarely used SIMD register set, such as the XMM registers in the IA-32 architecture.
39. Enforce the stack discipline using a single hash value that is occasionally stored and later checked to ensure that the intervening calls and returns were properly paired up. The hash can be kept in a register that is stolen from the application throughout its entire execution. On a call, the value in the register is hashed using an invertible hash function and the new value is written to the register. On a return, the register value is passed through the inverse function and the value prior to the call is restored. A different hash function per call target is used.
40. Allow returns if they satisfy the StackGhost transparent xor scheme [see M. Frantzen and M. Shuey. "Stackghost: Hardware facilitated stack protection", In Proc. 10th USENIX Security Symposium, August 2001].
41. Allow returns if a StackGuard canary created in the stack was not modified [see Crispin Cowan, Calton Pu, Dave Maier, Jonathan Walpole, Peat Bakke, Steve Beattie, Aaron Grier, Perry Wagle, Qian Zhang, and Heather Hinton, "StackGuard: Automatic adaptive detection and prevention of buffer-overflow attacks", In Proc. 7th USENIX Security Symposium, January 1998].
42. If the control transfer is due to an exception, validate the exception handler.
43. If the control transfer is due to an exception, validate the exception by maintaining a shadow stack of structured exception handlers.

The un-circumventable sandboxing provides the necessary mechanism to enforce a full set of rules that can guard against misuses of system calls. As there are many system calls with many use models, what is described here is an example of possible rules to sandbox one system call—the execve( ) UNIX system call. Other system calls can also be sandboxed.
44. The allowed system calls do not include the execve system call.
45. Allow the execve system call if the operation can be validated not to cause a problem.
46. Allow the execve system call if the arguments match a given regular expression.
47. Allow the execve system call only if the arguments are from a read-only data section.
48. Create a further restriction by combining either rules 45 and 47 or rules 46 and 47.
49. Allow the execve system call to be issued only from specific modules or functions.
50. Allow the execve system call.

Although these rules, as described, are composed as a disjunction, there are many other structures to organize the rules. For example, the rules can be broken into smaller clauses that are combined using arbitrary Boolean logic.

Attack Handling

When the next instruction or the control transfer to be executed is suspect or when a system call is invoked in a suspected manner, there are many possible remedial actions that can be taken. This section describes a few possibilities. Note that this is not an exhaustive list.
1. Log the event and continue execution. This provides an intrusion detection capability, but does not prevent the intrusion from succeeding.
2. Kill the application.

In the next set of actions, the attack is defeated while an attempt is made to keep the program alive. However, there is no guarantee that a program will keep working normally after such an action.
3. Kill the offending thread that is asking to execute the suspected action.
4. Throw an exception so that the program can bypass the suspected action.
5. Unwind the exception stack until a valid exception handler is found and throw an exception to that particular exception handler.

6. In a suspected system call, without performing the system call, continue execution as if the system call returned an error.
7. In case of an invalid control transfer or an invalid destination instruction due to a conditional branch, force the branch to not be taken.
8. In case of an invalid control transfer or an invalid destination instruction due to a call instruction, skip the call, simulate the return of an appropriate return value, and continue execution.
9. In case of an invalid return address in the stack, unwind the stack until a valid call frame is found and continue execution.
10. Continue execution with a different, or more restrictive, set of rules that will drastically reduce the possibility of damage from an attack.
11. Attempt to dynamically modify the program to correct the violations and make the program conform to the rules. If successful, continue execution; if not, use one of the previous attack handling techniques.

Another attack handling mechanism is to delay the continued execution after handling the attack in order to throttle multiple attacks into the system.

Security Policy

All of the enforceable rules described previously cannot be applied to all programs. While most broad rules are satisfied by many applications, compliance with some of the more restrictive rules has a significant variation among different programs. Furthermore, in a few programs there are exceptional circumstances that lead to violations of even the most general rules. Thus, there are tradeoffs between program freedom and security: if rules are too strict, many false alarms will result when there is no actual intrusion. Furthermore, there are many choices of remedial actions that can be made when a potential attack is detected.

Since monitored program execution can enforce multiple rules, each program requires a security policy that will dictate which of these rules are to be applied and what actions to take when a possible attack is detected. This section discusses the potential design space in creating a policy to provide significant protection without undue burden on the user and without annoying side effects such as false positives.

A security policy for an application, which is stored in a security policy database, comprises:
1. A list of rules that are active. For example, since most programs do not generate dynamic code, rules 5 to 18 can be turned off.
2. A list of rules that apply only to a specific instance identified by a combination of:
   a. The module name of the source, which is mainly used for RCT
   b. The module name of the destination, which is mainly used for RCO or RCT
   c. The source address, which is mainly used for RCT
   d. The destination address, which is mainly used for RCO or RCT
   e. The type of instruction, which is mainly used for RCT
   f. The type and origin of the arguments in a system call, which is mainly used for UCS.

When the source and the destination addresses are relative to the starting address of a DLL, the exceptions are valid even when the DLL is relocated. Note that this is only a partial list and other filters can also be applied to limit the rules.
3. A collection of data that is required by some of the active rules. For example, the rule 14 requires known trampoline instruction sequences.
4. Exceptions to the rules. These exceptions can be specified using the same set of filters as specified in 2.
5. The actions to take when a violation is detected.

FIG. 2: Attack Resilience

The program shepherding techniques described above can thwart a large class of typical attacks. FIG. 2 summarizes the contribution of each program shepherding technique toward stopping different types of attacks. The three right-hand columns represent the three techniques. A box containing "STOPPED" indicates that that technique can, in general, completely stop the attack type above. The term "HINDERED" indicates that the attack can be stopped only in some cases. The left-to-right order of the techniques indicates the preferred order for stopping attacks. If a further-left box completely stops an attack, the system does not invoke techniques to its right (e.g., sandboxing is capable of stopping some attacks of every type, but it only uses it when the other techniques do not provide full protection).

Under the column labeled "Attack Types", the categories of attacks are successively subdivided.

They are first subdivided into Existing Code and Injected Code. An Injected Code Attack forces the program to execute malicious code that is inserted as data by the attack itself. For Injected Code Attacks, the Code Origin policy disallows execution from address ranges other than the text pages of the binary and mapped shared libraries. This stops all exploits that introduce external code, which covers a majority of currently deployed security attacks.

Existing Code is further divided into Chained Calls and Other Transfers. An attacker may be able to execute a malicious code sequence by carefully constructing a chain of procedure activation records, so that a return from one function just continues on to the next one. This can be stopped by requiring that return instructions target only call sites, which comes under Restricted Control Transfer policy.

Other Transfers divide into Returns on one hand and Calls or Jumps on the other. Multiple return value attacks that are not chained can be dealt with effectively by a combination of Restricted Control Transfer policy and Uncircumventable Sandboxing.

Calls and jumps break down into inter-module and intra-module. For inter-module transfers, the system looks at entry and exit points specified by the modules. Attacks that violate these specifications are stopped by using Restricted Control Transfer policy. Otherwise Sandboxing is needed.

Attacks that use intra-module manipulation can be dealt with more easily when symbol information is available or can be deduced by analysis. If the attack has mid-function flow violations, then it is stopped by Restricted Control Transfer policy. Otherwise, or if symbol information is not available, Sandboxing is needed. Note that the above-discussed classification is neither exact nor comprehensive (nor required by the present invention), but reflects the current trends and methods used by attackers.

Example Implementation

One example of a method for implementing the present invention is by instrumenting the application and library code prior to execution in order to add security checks around every branch instruction and privileged operation. A few possible embodiments of such an implementation are described at an abstract level in FIGS. 4, 5, and 6. Another possible implementation is to use an interpreter or emulator. Interpretation is the most straightforward solution to provide complete mediation of control transfers on native binaries. It is a natural way to monitor program execution because every application operation is carried out by a central system in which security checks can be placed. One possible embodiment using an interpreter is described in detail starting from FIG. 8.

Another example of an implementation of the present invention is to use a low-overhead software system that creates, examines, and modifies execution traces. Such a system provides the exact functionality needed for efficient program shepherding. These systems begin with an interpretation engine. To reduce the emulation overhead, native translations of frequently executed code are cached so they can be directly executed in the future. An aspect of the innovation is the use of caching to eliminate most of the dynamic invocations of the security checks. Because of caching, many security checks need be performed only once, when the code is copied to the cache. If the code cache is protected from malicious modification, future executions of the trusted cached code proceed with no security or emulation overhead. One possible embodiment using such a code cache is described starting with FIG. 12.

FIG. 1: Block Diagram of the Abstract Components

A system that implements Program Shepherding can be divided into multiple components, as described in FIG. 1. These components consist of:

1. An application database (220) contains the application (221) in the form of source code, object code, or a binary file.
2. A security policy database (210) that stores both fundamental conventions that apply to all programs as well as application-specific security policies (211).
3. An analysis processor (230) that analyses the program to gather the information needed for program shepherding, identifying what security policies should be applicable to the application as well as creating application-specific security policies.
4. An instrumentation processor (231) that inserts the necessary checks in the program so that when the code is executed, the necessary tests are invoked with the information needed to carry them out.
5. An execution processor (232) that executes the instructions of the application on the given hardware platform.
6. A monitor processor (233) that guarantees all the necessary security checks are reliably executed without the risk of being bypassed.
7. An enforcement processor (234) that performs each security check, flags security policy violations and performs attack handling options.

Figure 3:
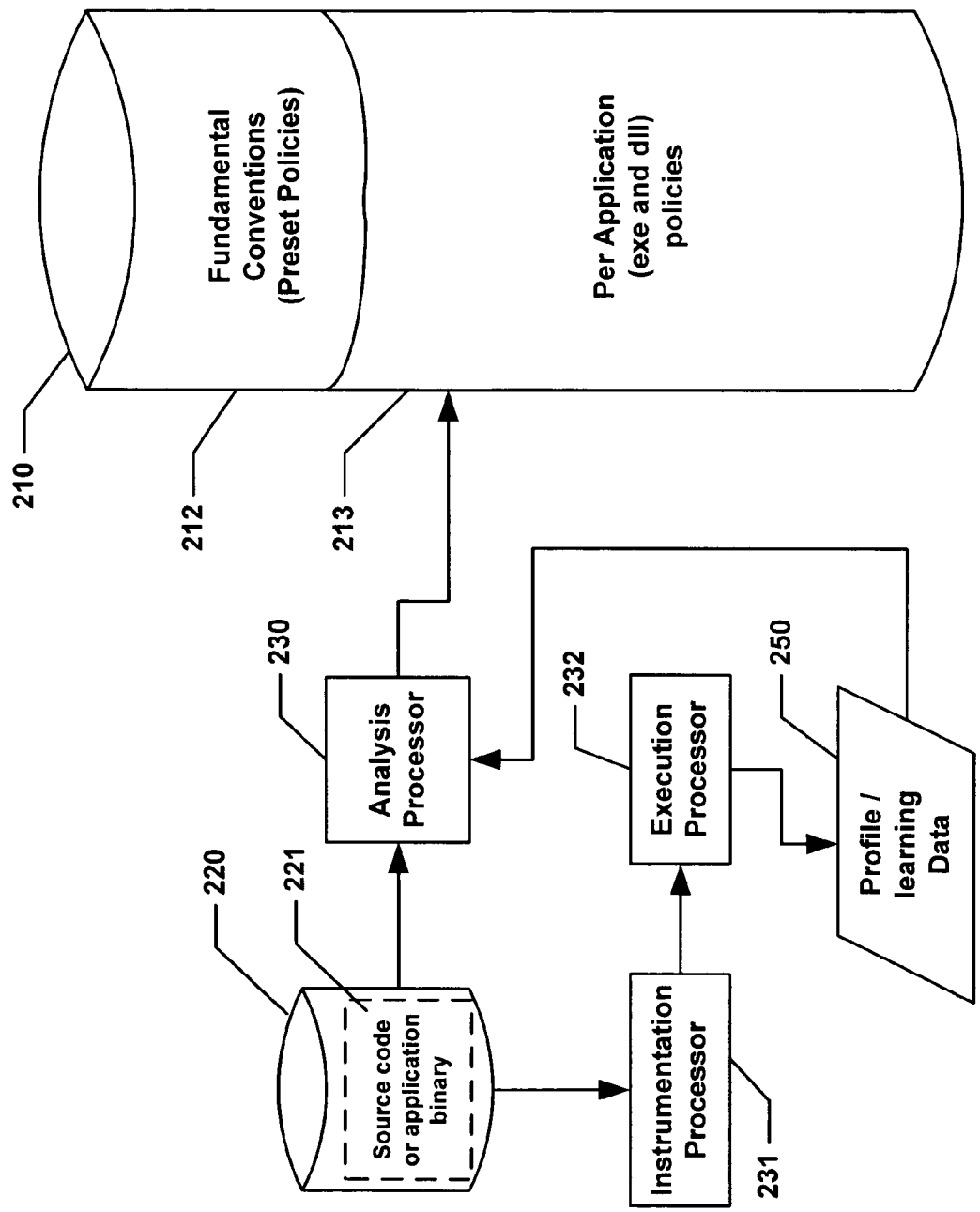
FIG. 3 is a block diagram of possible application-specific policy generation work flow.

FIG. 3: Creating Application-Specific Policies

FIG. 3 is a block diagram that describes some of the alternative paths available in creating an application-specific policy.

The security policy database (210) has two components: fundamental conventions that apply to all the programs (212) and application-specific policies (213). Application-specific policies are created by either analysis of the source code (221) in the source code database (220), by the Analysis processor (230) or by first instrumenting the application (231), then executing it (232) and finally gathering profile information (250) which is analyzed (230) to create the application-specific policy.

There are many possible embodiments of Program Shepherding. Most of the variations center on how and when analysis and instrumentation are performed. The example embodiments in FIGS. 4, 5, 6 and 7 show only a few combinations of analysis and instrumentation. Since analysis and instrumentation can be decoupled, there are many other valid combinations of analysis and instrumentation points.

Figure 4:
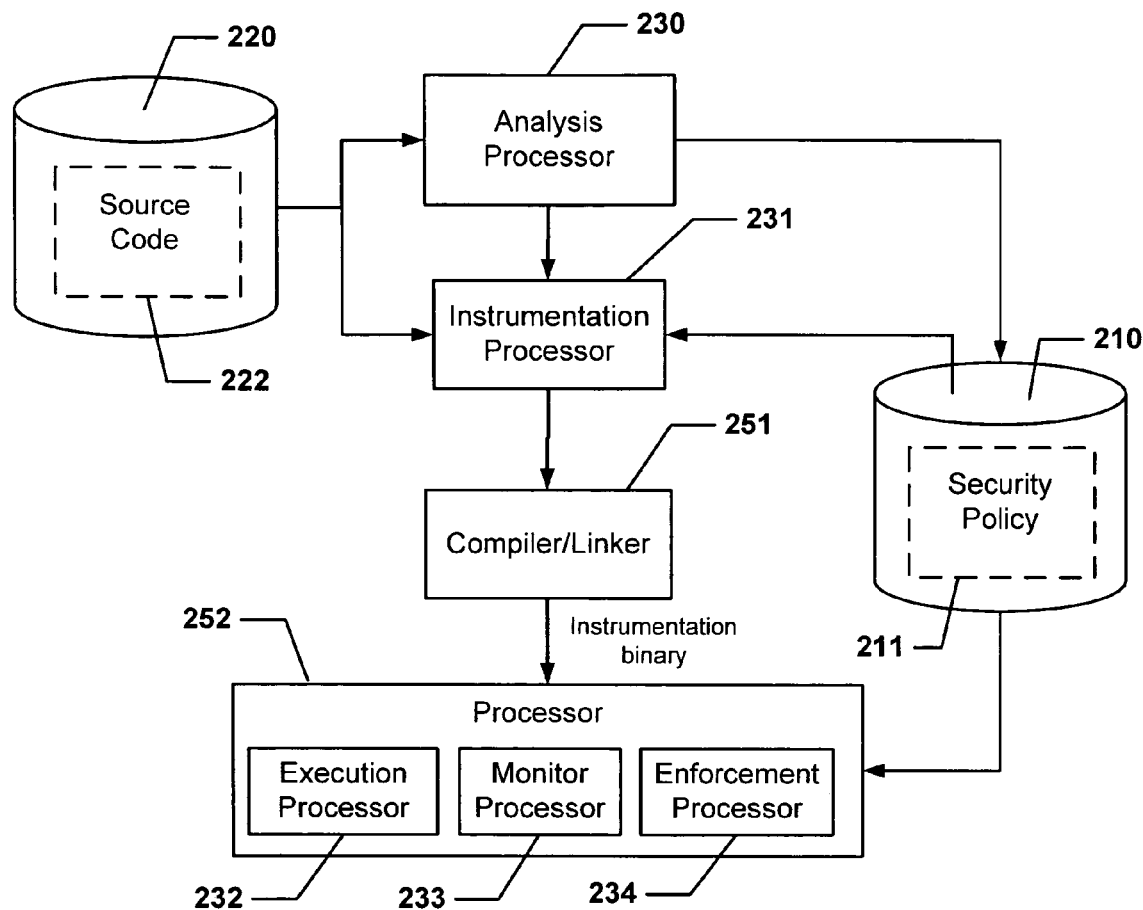
FIG. 4 is a block diagram of analysis and instrumentation of source code.

FIG. 4: Analysis and Instrumentation of Source Code

FIG. 4 is a block diagram that describes how analysis and instrumentation can be performed on source code. Note that it is not necessary for both analysis and instrumentation to be performed at the same level. For example, it is perfectly possible to perform analysis on the source code but instrumentation on the binary. As depicted in FIG. 4, the application database (220) contains the source code (222) of the application. The source code is analyzed by the analysis processor (230). This analysis information may be fed into the security policy database (210) to form an application-specific security policy. The instrumentation processor (231) works on the source code with the information provided by the analysis processor as well as the security policy (211) and instruments the program with the appropriate checks. The compiler (251) processes the resulting modified source code into an Instrumentation Binary. At runtime (252), the application is executed (232) alongside the monitoring of control transfers (233). The necessary policy violation checks are done by the enforcement processor (234) using the policy information (211) from the policy database (210).

Figure 5:
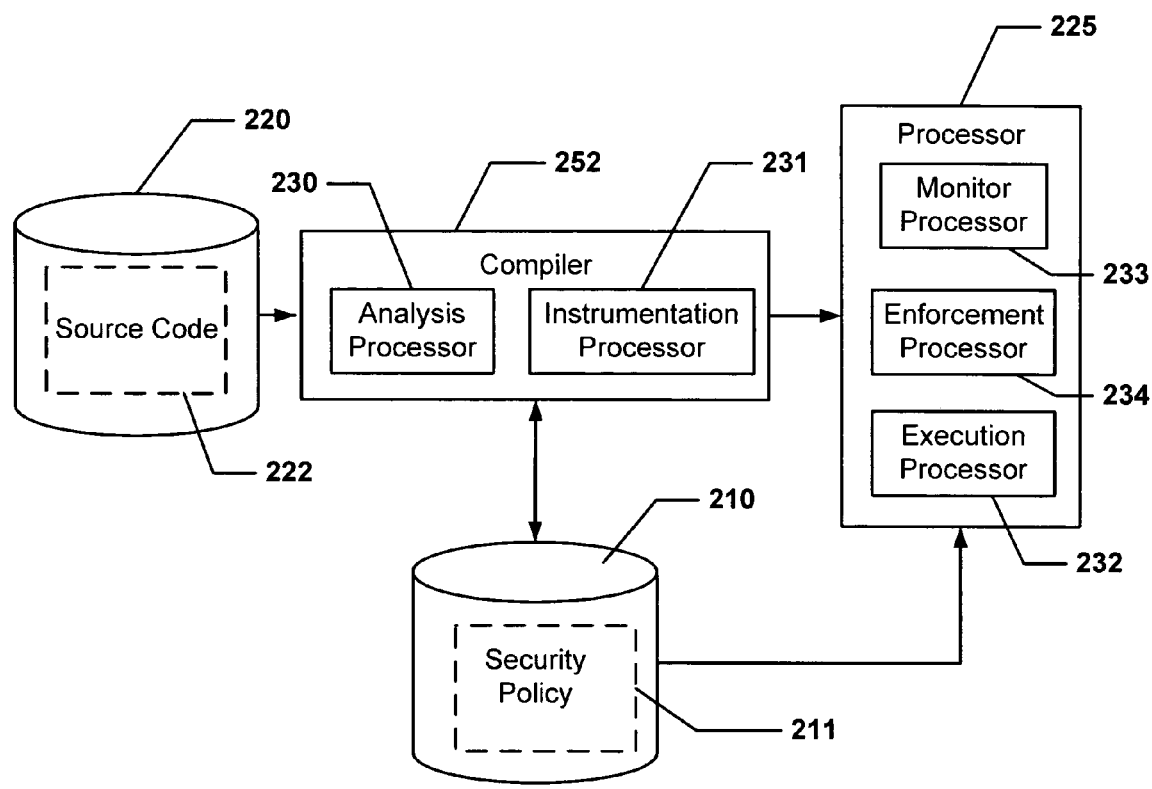
FIG. 5 is a block diagram of analysis and instrumentation in the compiler.

FIG. 5: Analysis and Instrumentation by the Compiler

FIG. 5 is a block diagram that describes how analysis and instrumentation is performed in the compilation process. As described in FIG. 5, the analysis (230) and instrumentation (231) is performed within the compiler (252). The application database (220) provides the compiler with the source code (222). The security policy database (210) provides the compiler with the security policy (211) and optionally can get back information on application-specific policies. At runtime (252), the application is executed (232) alongside the monitoring of control transfers (233). The necessary policy violation checks are done by the enforcement processor (234) using the policy information (211) from the policy database (210).

Figure 6:
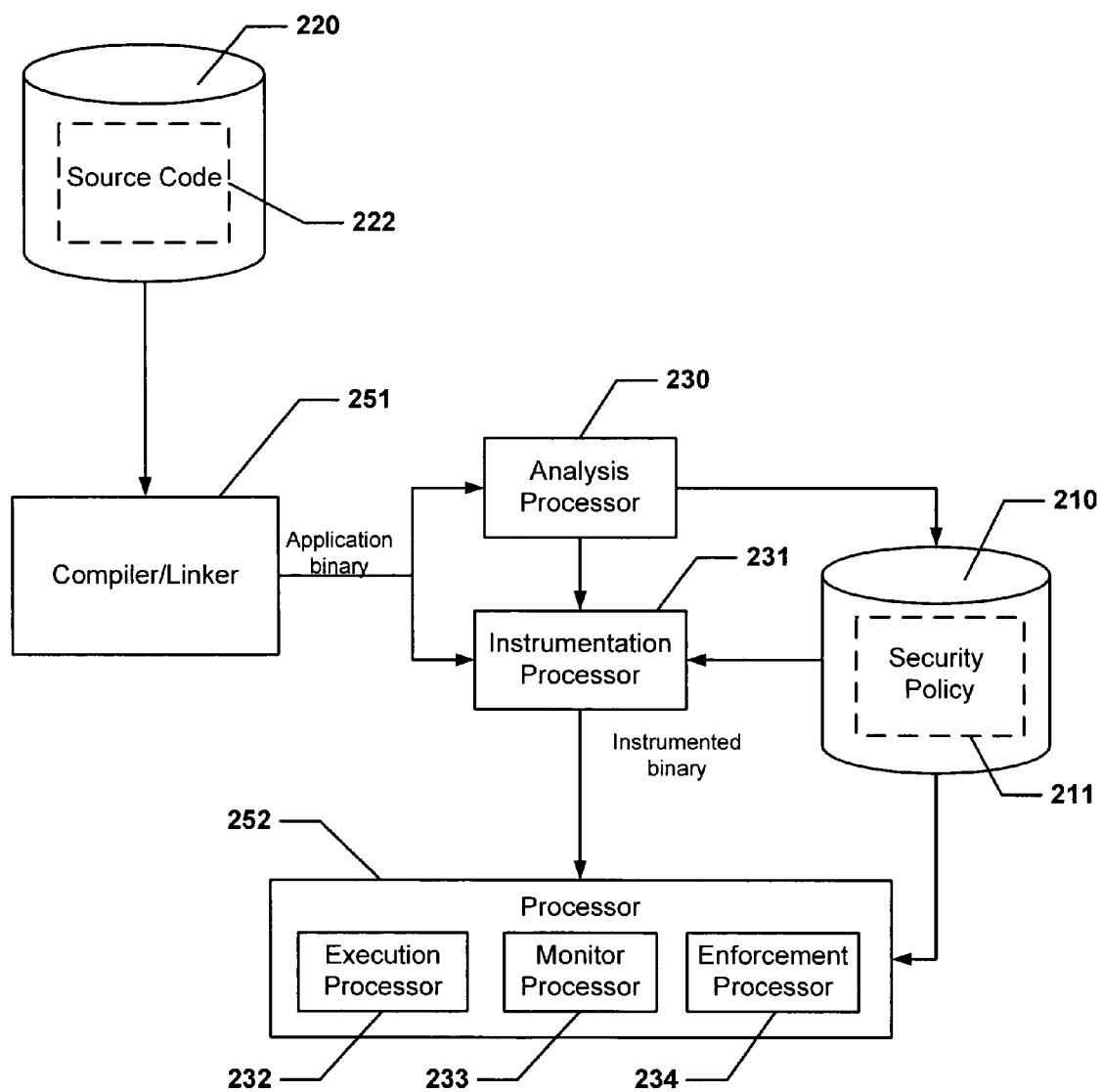
FIG. 6 is a block diagram of analysis and instrumentation of the binary.

FIG. 6: Analysis and Instrumentation of the Binary

FIG. 6 is a block diagram of an embodiment where the analysis and instrumentation is performed on the binary image. The application database (220) provides the source code (222) which is first compiled and linked (251) to create an executable file. The executable is used by the analysis processor (230) and the information is passed to the instrumentation processor (231) and optionally to the security database (210) to form an application-specific security policy. The instrumentation processor, using the information from the analysis processor as well as the security policy (211), instruments the application binary. Note that the analysis processor can either pass the analyzed binary to the instrumentation in a coupled mode or decoupled with instrumentation where the instrumentation processor works on an unmodified binary and a saved application-specific policy. At runtime (252), the application is executed (232) alongside the monitoring of control transfers (233). The necessary policy violation checks are done by the enforcement processor (234) using the policy information (211) from the policy database (210).

Figure 7:
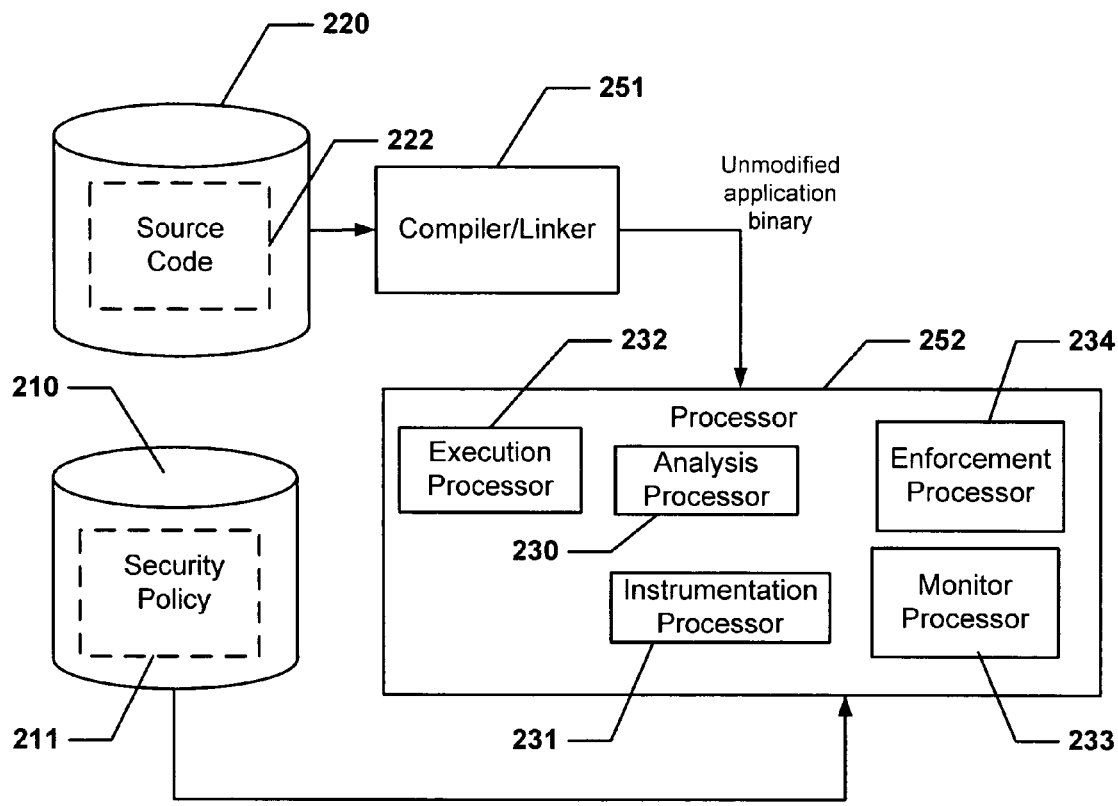
FIG. 7 is a block diagram of analysis and instrumentation at runtime.

FIG. 7: Runtime Analysis, Instrumentation

FIG. 7 is a block diagram of an embodiment where all the processing is done at runtime. The two detailed embodiments described later in the document closely resemble this configuration. However, note that for both detailed embodiments, the analysis processor can be applied before runtime to create an application-specific policy which is used at runtime. In this embodiment described in FIG. 7, analysis (230) and instrumentation (231), as well as monitoring (233), enforcement (234) and execution (232) are done at runtime (252). The application database (220) provides the source code (222)

which is first compiled and linked (251) to create an executable file. However, this executable file has no program shepherding-specific information. Program Shepherding is fully implemented at runtime using a security policy (211) provided by the policy database (210).

Embodiment Based on a Runtime Emulator

To help clarify various aspects of the invention, the following sections provide an example embodiment of Program Shepherding. In this embodiment, a set of rules, from the Enforceable Rules described above, were selected to demonstrate the general capabilities of the system. The embodiment closely resembles the rule #1, relaxed as described by #3, for code origins, where code from an application or dynamically loaded library is considered valid, as long as it has not been modified since it was loaded. Also, the system uses rules #33 and #34 for restricted control transfers, allowing a return if its destination is preceded by a call instruction.

Figure 8:
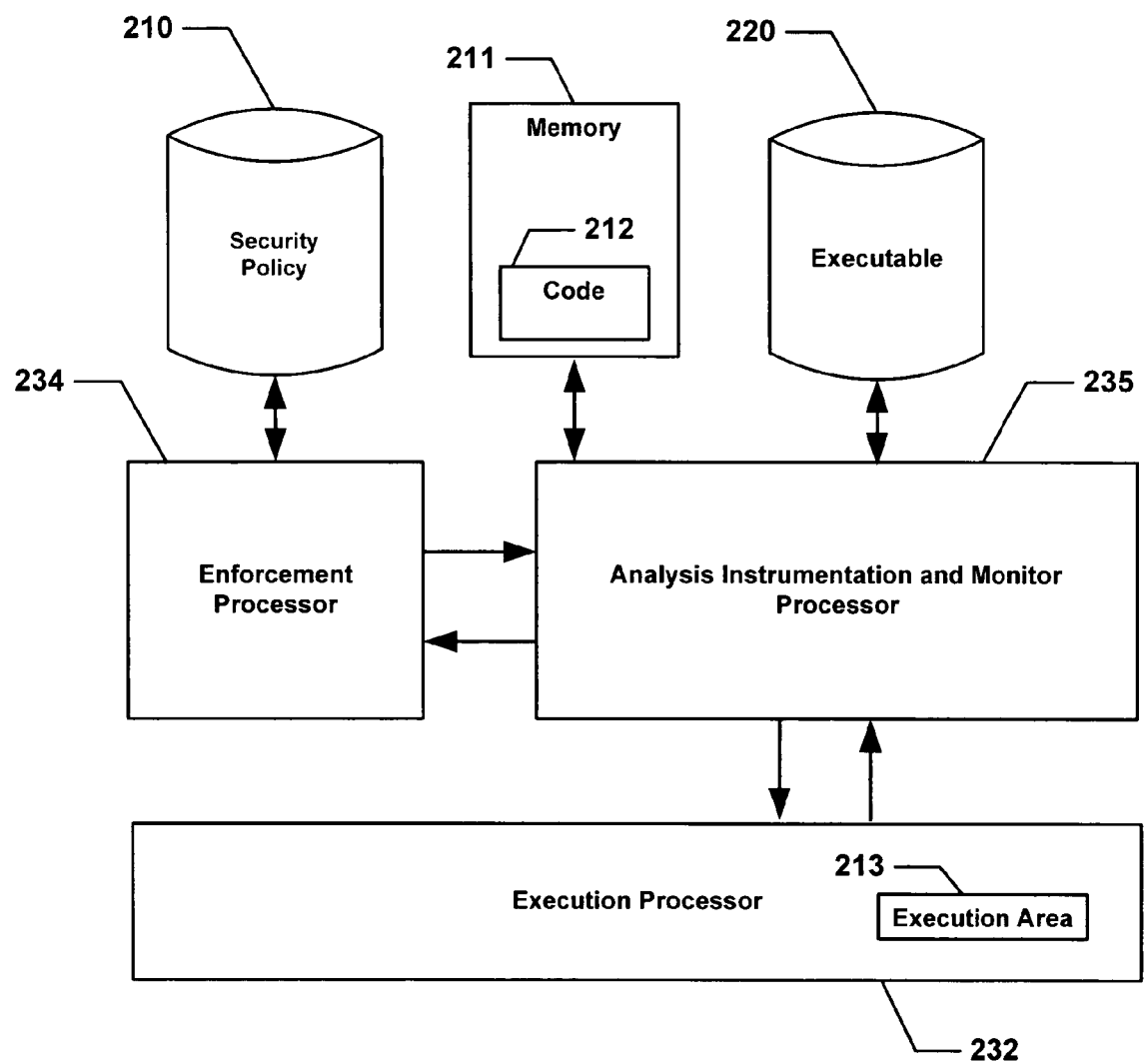
FIG. 8 is an overview block diagram of an embodiment using a runtime emulator.
Figure 9:
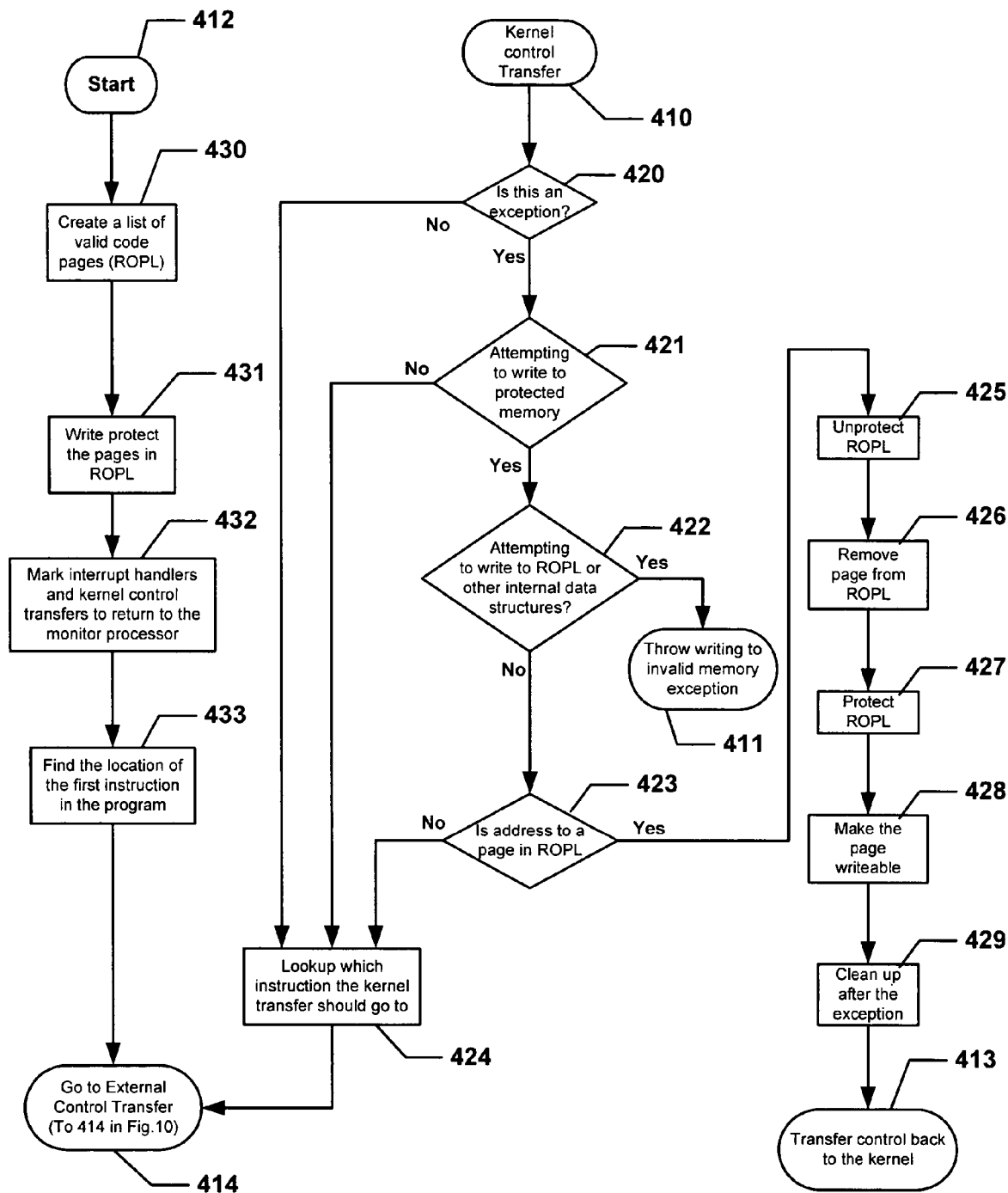
FIG. 9 is a flow chart describing the setup process of the embodiment in FIG. 8.
Figure 10:
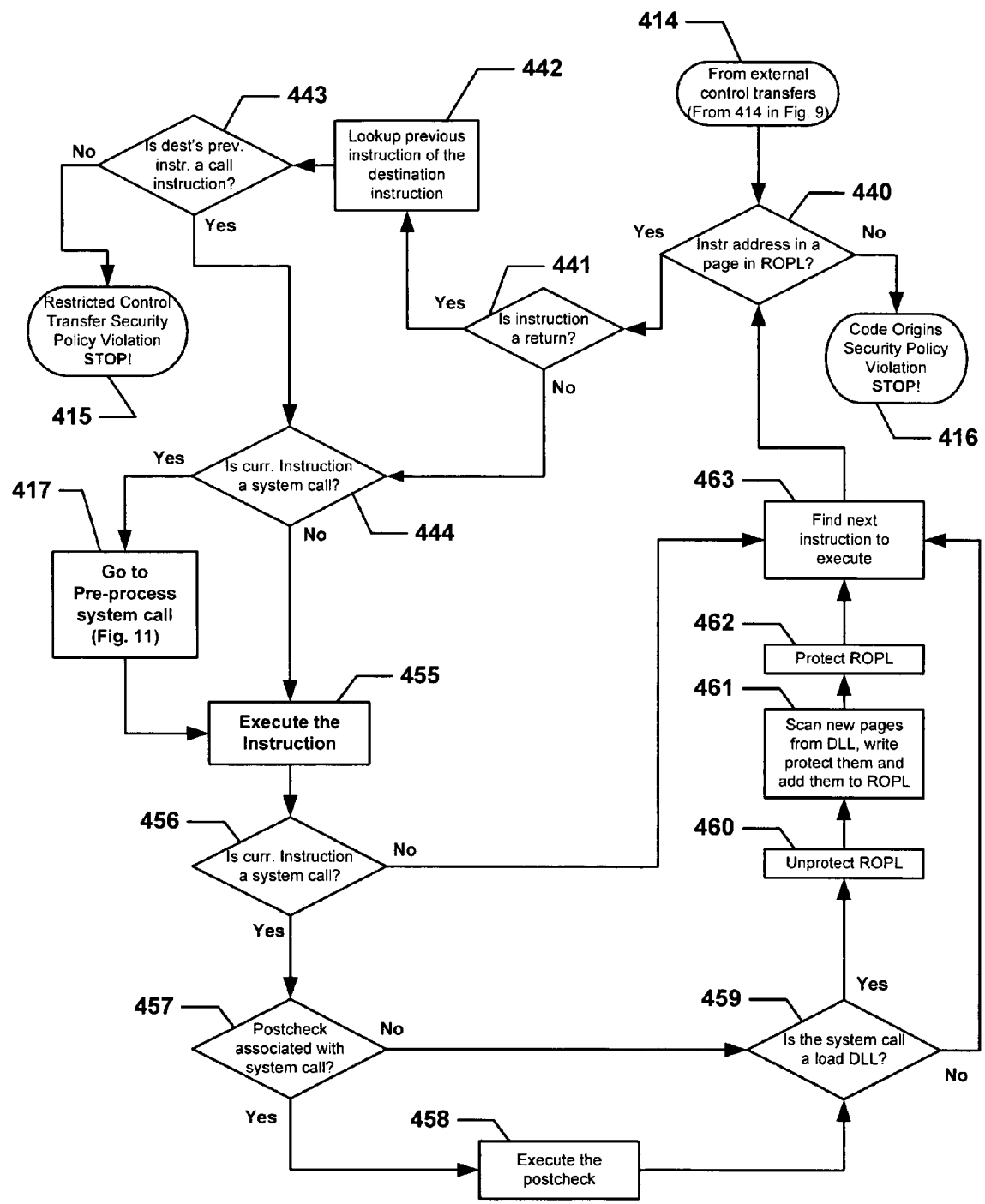
FIG. 10 is a flow chart describing the operations of the embodiment in FIG. 8.
Figure 11:
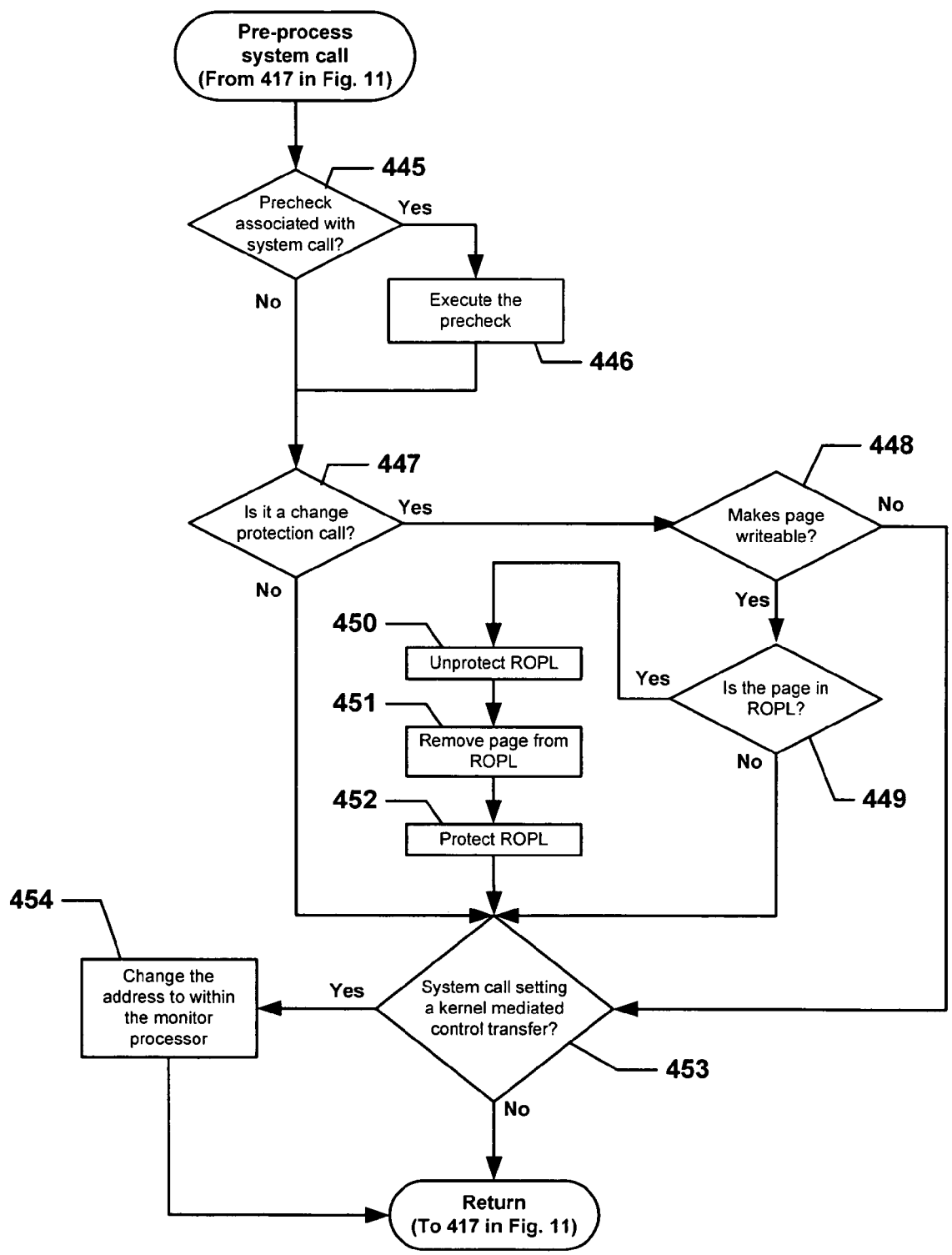
FIG. 11 is a flow chart describing the call pre-check handling of the embodiment in FIG. 8.

FIG. 8 is a block diagram of this embodiment while FIGS. 9, 10 and 11 are a composite flow chart describing the operation.

FIG. 8: Block Diagram of the Runtime Emulator

FIG. 8 is an overview block diagram of an example embodiment. The executable program starts out on a disk or other external storage (220) and is then loaded or mapped into computer memory (211) where it would normally be executed (212). Instead, Program Shepherding inserts itself at the beginning of this process to both analyze the program and to set up the Program Shepherding execution Monitoring process (235). Meanwhile, the Enforcement Processor (234) starts up by reading in the current security policy (210). The analysis mentioned relative to (235) can augment or modify the security policy.

In its simplest terms the system then runs the code on the fly in an execution area (213) while all data is accessed in the same location as that done in the original program. This can be done by simulating or emulating each instruction in the program. Policy enforcement can then be easily applied on the fly between executions of the instructions. In particular, in this mode of operation it is very easy to check the validity of control transfer targets, since the system must examine them in any case.

The Analysis, Instrumentation and Monitor Processor (235) carries out this process identifying the next instruction to the Execution Processor (232) for actual execution. Before execution of an instruction in the Execution Processor (232), The AI&M Processor (235) may invoke the Enforcement Processor (232) for policy enforcement. Policy validation in the executing group of instructions can be accomplished either by code inlined by the AI&M Processor, in cooperation with the Enforcement Processor, or by calling directly to the Enforcement Processor.

FIG. 9: System Setup

FIG. 9 is a flow chart that describes how control transfer in to the application, either at the start or via a kernel mediated control transfer, is handled. The actions in this flow chart belong to instrumentation, monitoring and enforcement. The system begins at (412) by creating a list of pages for valid loaded code (430) that is write-protected (431). This is the Read-Only Page List or ROPL. This is how the system identifies the code that remains unmodified after it is loaded into memory. The system changes the permissions on a page containing such code to write-protected and then puts the page on the ROPL list to keep track of it. Any page on the ROPL list contains code that has been unmodified since loading. At (432), the system modifies interrupt handlers and kernel control transfers to return to the AI&M Processor, preventing control from reaching the original code through these routes.

Finally at (433) it finds the first instruction in the program and then goes on to (414) in FIG. 10.

When the kernel passes control to the Runtime system, it enters at (410). If this entry is due to an exception (420), the system checks if it was due to an attempted write to protected memory (421). If the target was the ROPL or other internal data structures (422), the system throws an exception for writing to invalid memory (411). Otherwise the system checks to see if the attempted write was to a page listed in the ROPL (423). If not, the system determines the instruction the kernel should transfer to (424) and carries on with (414) in FIG. 10.

If the write was to a page in ROPL at (423), the system implements a simplified policy that does not support writing to code pages, in which later use of code on such a page will result in a policy violation at (416) in FIG. 10.

At this stage the system does the following:
Unprotects the ROPL (425) using a system call to change the permissions on the page that contains it.
Removes the page from the ROPL (426), a standard list unlink operation
Re-protects the ROPL (427), again using a system call
Makes the removed page writeable (428)
Cleans up after the exception (429)
Transfers control back to the kernel (413)

After this there is no longer any guarantee that the code on that page is unmodified. That is why it was just removed from the ROPL.

FIG. 10: System Operation

FIG. 10 is a flow chart that describes the basic execution loop in the emulation system. The actions in this chart include monitoring, execution and enforcement activities.

Here the system begins at (414) with a given instruction address. This is the entry for external control transfers. Then it determines if the given instruction address refers to code that might have been tampered with. This is determined by seeing if the code is contained within a page in the ROPL (440). If not, it stops with a Code Origins security policy violation (416). As described above, this ensures that the system only executes code that has been unmodified since loading.

Otherwise the code is valid and the system next checks at (441) if the current instruction is a return. If not, the system continues at (444) described below.

If it is a return, the system determines if the return destination is valid. There are a number of ways to do this as described in the rules. In this case, at (442), the system looks up the instruction just preceding the return destination. At (443) the system checks if that instruction is a call. This is a necessary requirement for validity, but in general it is not sufficient. If it is not a call, the system stops with a Restricted Control Transfer policy violation at (415). If it is, the system continues at (444).

At (444) the system determines if the current instruction is a system call and if so (417) pre-processes the system call as described in FIG. 11. Then at (455) the system executes the instruction. Following that, at (456), if the instruction is not a system call, the system finds the next instruction to execute (463) and then proceeds to (440). If that just executed instruction was a system call with an associated post-check (457), the system executes the post-check at (458).

If the executed instruction was a Load DLL (459), then the system collects the list of pages containing the code that was just loaded and sets it up like originally loaded code by adding it to the ROPL unmodified code list. To do this the system unprotects the ROPL (460), write-protects the pages associated with the loaded DLL and adds them to the ROPL (461), and then re-protects the ROPL (462). At (463) the system finds the next instruction to execute and then continues on at (440) as above.

FIG. 11: System Call Pre-Processing,

FIG. 11 is a flow-chart that describes the un-circumventable sandboxing performed on the program. These activities mainly belong to monitoring and enforcement. If the instruction is a system call, the system determines if there is an associated pre-check (445) and if so, executes that check (446). If the instruction is to change the memory protection status of a memory page (447), the system checks to see if it is to make it writeable (448). Such a change removes the guarantee that the code on that page is unmodified, so it must be removed from the ROPL unmodified page list (449). The system does this by unprotecting the ROPL (450), removing that page from the ROPL (451) and re-protecting the ROPL (452). For any system call that is setting a kernel mediated control transfer (453), the system modifies the target of that transfer to a location in the IA&M Processor that will handle it (454). This ensures that control does not reach the original code.

Embodiment Based on a Software Code Cache

Another embodiment of the present invention implements Program Shepherding using a Software Code Cache, a technique known to practitioners in the art. An overview of the embodiment using a Software Code Cache is provided in FIG. 12, with the Code Cache represented by the two blocks (242) and (241). The security policy is stored in (210).

In a normal system, code is copied from external storage (220), such as a disk, placed in memory and then executed directly from memory by the processor. In the Code Cache based system, the code is copied from memory in groups called fragments, blocks or "basic blocks," into such a Code Cache. These blocks are executed by the Execution Processor (232). In some embodiments, this is the only way user or application code is executed.

The blocks are created by the Block Builder (238), while the Trace Builder (239) creates groups of blocks called traces.

In terms of security policy, Restricted Code Origins is implemented by adding checks at the point when the system copies a basic block into the code cache. The decisions associated with such security checks are carried out by the Analysis and Enforcement processor (234), which obtains policy from (210).

Checking code origins involves negligible overhead because code need only be checked once prior to insertion into the code cache. Once in the cache no checks need to be executed. Code origin checking requires that the runtime system know whether code has been modified from its original image on disk, or whether it is dynamically generated. This is done by write-protecting all pages that are declared as containing code on program start-up. In normal ELF binaries, code pages are separate from data pages and are write-protected by default. Dynamically generated code is easily detected when the application tries to execute code from a writable page, while self-modifying code is detected by monitoring calls that unprotect code pages. If code and data are allowed to share a page, a copy is made of the page, which is write-protected, and then the original page is unprotected. The copy is then used as the source for basic blocks, while the original page's data can be freely modified. A more complex scheme must be used if self-modifying code is allowed. Here the runtime system must keep track of the origins of every block in the code cache, invalidating a block when its source page is modified. The original page must be kept write-protected to detect every modification to it.

A software code cache is an ideal infrastructure for an efficient implementation of RCT. For direct branches, the desired security checks are performed at the point of basic block linking. If a transition between two blocks is disallowed by the security policy, they are not linked together. Instead, the direct branch is linked to a routine that announces or handles the security violation. These checks need only be performed once for each potential link. A link that is allowed becomes a direct jump with no overhead. Indirect control transfer policies add no performance overhead in the steady state, since no checks are required when execution continues on the same trace. Otherwise, the hash table lookup routine translates the target program address into a basic block entry address. Only validated control transfers will be entered in the hash tables, resulting in no extra overhead for security checks for indirect transfers that only examine their targets. Policies that also examine the type of a control flow transition can be implemented using a separate hash table to look up the target for validation for different types of indirect control transfers (return instruction, indirect calls, and indirect branches). This enables type-specific restrictions without sacrificing any performance when execution continues in the code cache. These context-insensitive policies can be easily enforced with minimal overhead because they are always valid after initial verification, therefore they can be cached and cheaply evaluated with minimal execution overhead. Any policies that need to examine both the source and the target of a transition can be implemented using a separate hash table for each source location.

When required by the security policy, the monitoring processor inserts sandboxing into a basic block when it is copied to the code cache. In traditional sandboxing, an attacker can jump to the middle of a block and bypass the inserted checks. The system only allows control flow transfers to the top of basic blocks or traces in the code cache. An indirect branch that targets the middle of an existing block will miss in the indirect branch hash table lookup, go back to the monitoring processor, and end up copying a new basic block into the code cache that will duplicate the bottom half of the existing block. The necessary checks will be added to the new block, and the block will only be entered from the top, ensuring that the system follows the security policy. Restricted code cache entry points are crucial not just for building custom security policies with un-circumventable sandboxing, but also for enforcing the other shepherding features by protecting the runtime system itself.

There is a multitude of possible and often conflicting policies that can be implemented with the three techniques of program shepherding. Thus, the embodiment, as described, closely resembles only a selected set of rules, and is only a demonstration of the general mechanisms of the invention applied to these policies. For code origins the rule #2 with the relaxation described in #3 was used. There is also support for rule #5 as an application-specific policy. The restricted control transfers is demonstrated using the rules #22, #24, #26, #27, #28 restricted as described in #31, #29 restricted as described in #31, #32, and #36. Un-circumventable sandboxing demonstrates how to check the system calls and exceptions that are required to implement the above rules. For example, the load DLL system call is sandboxed in order to implement rule #3.

FIG. 12: Overview

Figure 12:
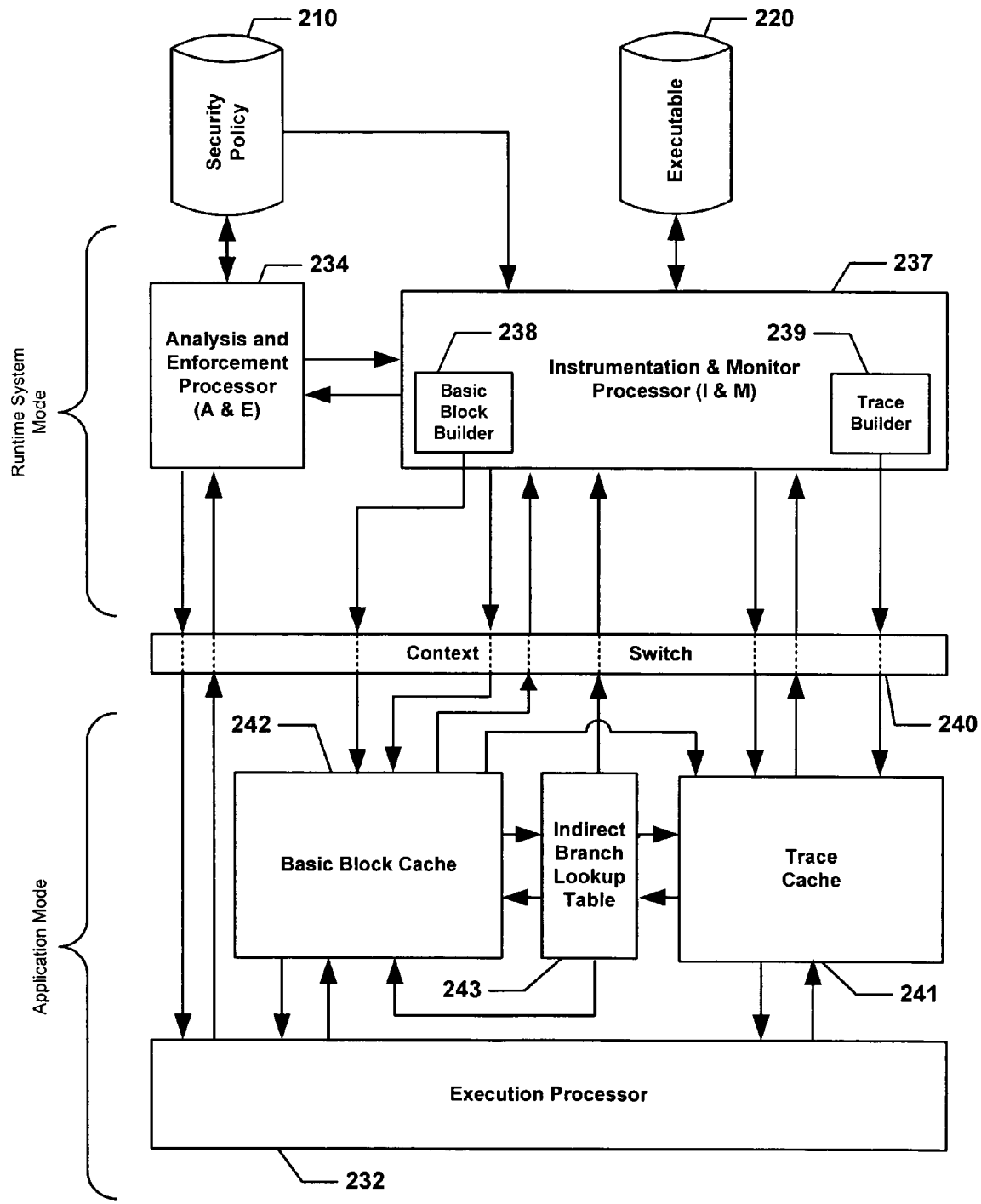
FIG. 12 is an overview block diagram of an embodiment using a software code cache.

FIG. 12 is an abstract block diagram of the second embodiment. This is an expansion on the configuration described in FIG. 7 where analysis, instrumentation, monitoring, execution and enforcement are all done at runtime. However, note that an analysis pass performed before runtime can be used to create an application-specific policy.

Execution is divided into two modes: Runtime System Mode and Application Mode. The Runtime System controls the overall operation: putting application code fragments into the Code Cache, starting those code fragments running in Application Mode and controlling security policy.

The system is designed so that the application code running in Application Mode runs in its own context to preserve transparency, and limiting interaction with code operations and data allocations done by the Runtime System. Hence there is a context switch between transitions between Application Mode and Runtime System Mode.

Other parts of the system are designed to avoid context switches by staying within Application Mode as long as possible. These include the direct linking of blocks within the Code Cache, the Indirect Branch Lookup Table and the Trace Cache, explained in more detail below.

Runtime System Mode corresponds to the top half of FIG. 12 above the context switch component, (240). Application Mode corresponds to the bottom half, below (240), including the Code Cache, consisting of the Block Cache (242) and the Trace Cache (241), and those Shepherding routines that are executed without performing a context switch back to the Shepherding half, including the Indirect Branch Lookup Table (243), which is implemented as one or more hash tables, a well-known concept in the art.

For the two modes, the system assigns each type of memory page the privileges shown in the following table:

| Page Type | Runtime System Mode | Application Mode |
| --- | --- | --- |
| Application Code | Read | Read |
| Application Data | Read, Write | Read, Write |
| Shepherding Code Cache | Read, Write | Read, Execute |
| Shepherding Code | Read, Execute | Read |
| Shepherding Data | Read, Write | Read |

Runtime System data includes the Indirect Branch Lookup Table, (243), and other data structures.

All Application and Runtime code pages are write-protected in both modes. Application data is, of course, writable in Application mode, and there is no reason to protect it from the Runtime System, so it remains writable in that mode. Runtime data and the code cache can be written to by the Runtime itself, but they must be protected during Application Mode to prevent inadvertent or malicious modification by the user application.

If a block copied to the Code Cache contains a system call that may change page privileges, the call is sandboxed to prevent changes that violate the above table. Program Shepherding's Uncircumventable Sandboxing guarantees that these sandboxing system call checks are executed. Because the Runtime's data pages and the code cache pages are write-protected when in Application Mode, and the system does not allow user application code to change these protections, it is guaranteed that the Runtime System's state cannot be corrupted.

If the Operating System detects an access violation, it goes to the exception handler in the Enforcement Processor, (234). More specifically, this is dealt with in FIG. 23. The system could also protect the Global Offset Table (GOT) by binding all symbols on program startup and then write-protecting the GOT.

The Indirect Branch Lookup Table is key to the working of the system. The system does not modify how a program computes addresses, but it does modify how the addresses are used in branch instructions. Since we relocate code from its original position in memory to a code cache, the Indirect Branch Lookup Table provides the crucial mapping from those original addresses to the new location of the code in the Code Cache. So when the original code does a branch to an address, the system modifies it to branch to the new location of that code in the Code Cache. A key design factor that keeps execution within Application Mode, reducing the number of context switches, is how direct and indirect control transfers are handled.

Direct control transfers, where the target is known before the program runs, are dealt with entirely within the Code Cache which includes the Block Cache (242) and the Trace Cache (241). This is done by checking if the Restricted Control Transfer policy is satisfied and if so, by modifying the target address to refer to the copy of the code in the Code Cache rather than the original code.

Indirect control transfers, where the target is not known until runtime, require the use of the runtime Indirect Branch Lookup Table, (243). While the original code jumps directly to a target address, the copy of that code has been modified to obtain its actual target by looking it up in this table. Given an address referring to the original code, the Indirect Branch Lookup Table returns a reference to the copy of that code in the Code Cache. This approach preserves correct policy since entries are only added to this lookup table if they satisfy the policy.

If a target is not known to satisfy policy as above, the system does a context switch and returns to the Monitor Processor, (237). The Monitor calls the Enforcement Processor (234) to see if the target satisfies policy and whether it should be added to the Indirect Branch Lookup Table, as detailed below.

The system applies policies regarding control flow for both direct and indirect control transfers. Direct transfers are monitored as a target block is copied into the Code Cache. Indirect transfers are monitored indirectly by policies determining what entries are placed in the Branch Lookup Table, (243). The Trace Cache basically allows for sequences of basic blocks that can execute entirely within Application Mode without incurring a context switch.

Figure 13:
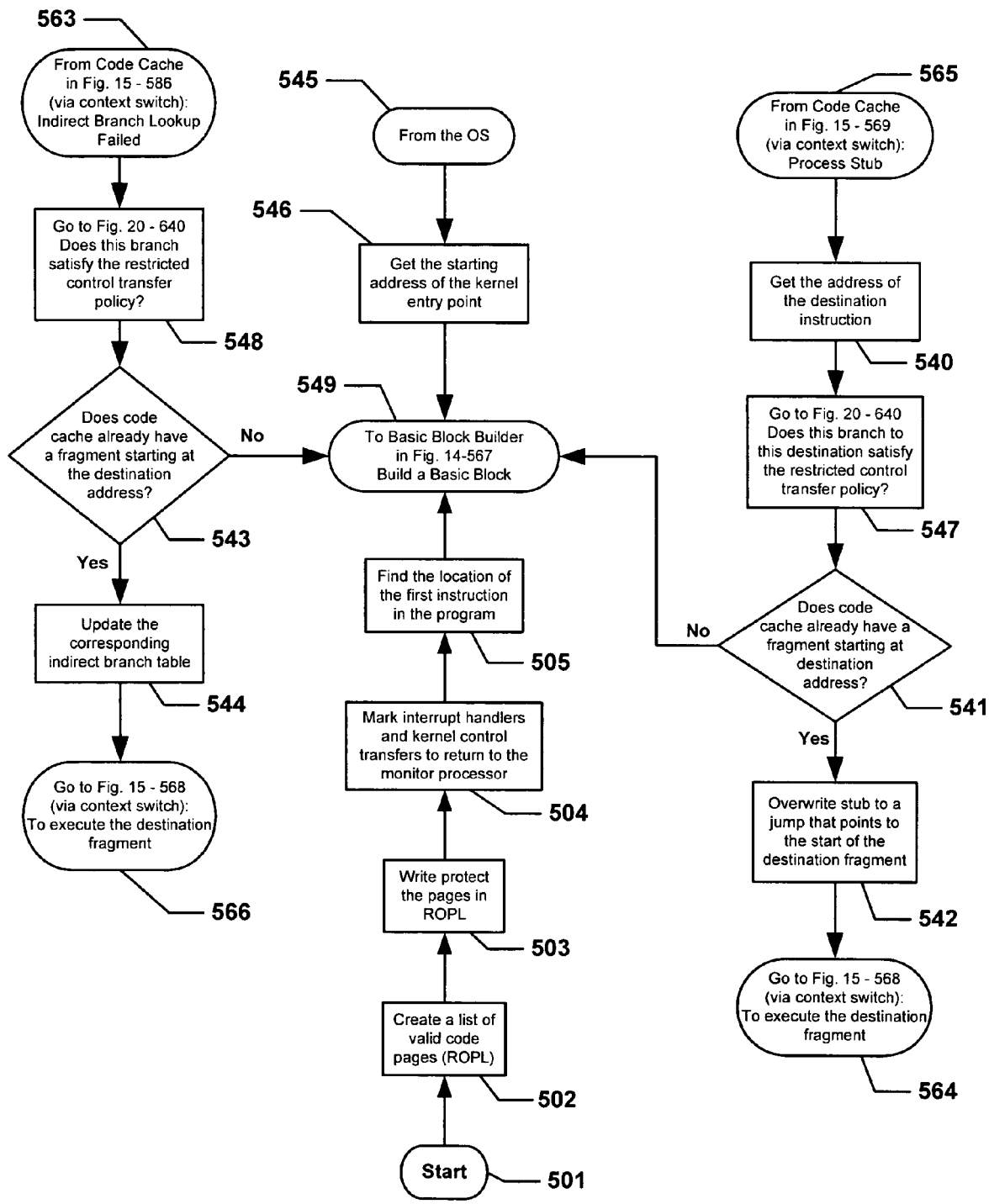
FIG. 13 is a flow chart describing the Monitor Processor of the embodiment in FIG. 12.

FIG. 13: Monitor Processor

FIG. 13 is a flow chart that describes most of the monitoring and instrumentation activities in the Instrumentation and Monitor Processor. This is the main runtime loop that is activated when the control is transferred either at program startup, from a kernel mediated control transfer, or from the code cache. The Monitor processor is the first one executed when an application is protected by Program Shepherding. The Monitor also deals with newly discovered target addresses which arise from the Code Cache (FIG. 15) through stubs or failed lookups of the Indirect Branch Table. The Block Builder has placed a stub at the end of a basic block when there was a branch to a new target.

When the program starts at the bottom of FIG. 13 (501), all the valid code pages are identified and a Read Only Page List is created (502), and these pages are write-protected (503). Any interrupt handlers and kernel control transfers are setup such that the control will be transferred to the monitoring processor rather than directly to the program address (504). Finally, the starting address of the program is found (505) and basic block building is started from that address (549).

When the Monitor is started directly from the OS (545), the system gets the starting address of the kernel entry point (546) and at (549) passes that to the Block Builder for it to build a basic block starting at that address. The Block Builder (see FIG. 14) creates the block and places it in the Code Cache (561) of FIG. 14. After that the Block Builder tells the Code Cache (FIG. 15) to start executing the new block.

Figure 15:
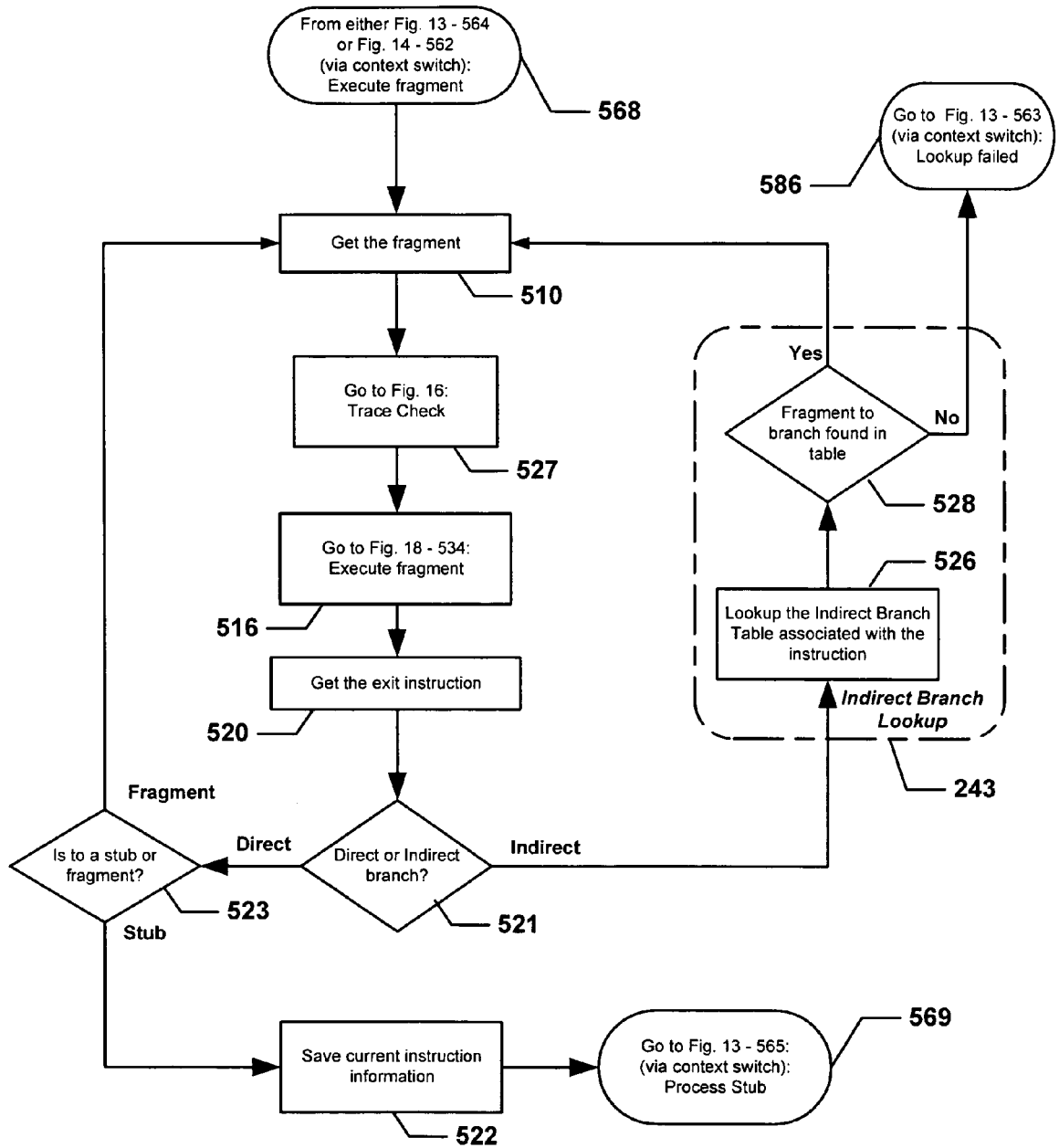
FIG. 15 is a flow chart describing the Code Cache of the embodiment in FIG. 12.

The Monitor is also entered at (565) from the Code Cache (FIG. 15) when it encounters an exit stub at (523) of FIG. 15. In that case the Monitor gets the target address (540) and then queries the Enforcement Processor (FIG. 20) whether this control transfer is permissible (547). If so, it continues by seeing if the Code Cache already has a fragment starting at the destination address (541). If it does, it overwrites the exit stub with a branch to the corresponding block (542), setting a direct block-to-block link, and then tells the Code Cache at (564) to start up that block. If the control transfer is not permissible, the Enforcement Processor (234) of FIG. 12 deals with the problem without returning (637—FIG. 20).

The Monitor is also entered from the Code Cache when an indirect branch lookup has failed at (563). The first step in this case is to verify the branch satisfies the security policy for this indirect branch (548) by going to the Enforcement Processor, FIG. 20. Then it checks if the Code Cache already has a fragment at this target/destination address (543). If not, it directs the Block Builder to build a new block (549) and run it (562—FIG. 14). Otherwise, a fragment already exists for the target address, so at (544) the system updates the corresponding Indirect Branch Table with that looked-up fragment address and directs the Code Cache to start executing the destination fragment (566). As above, at (548) if the target address is not permissible, the Enforcement Processor (234) FIG. 12 takes over.

Figure 14:
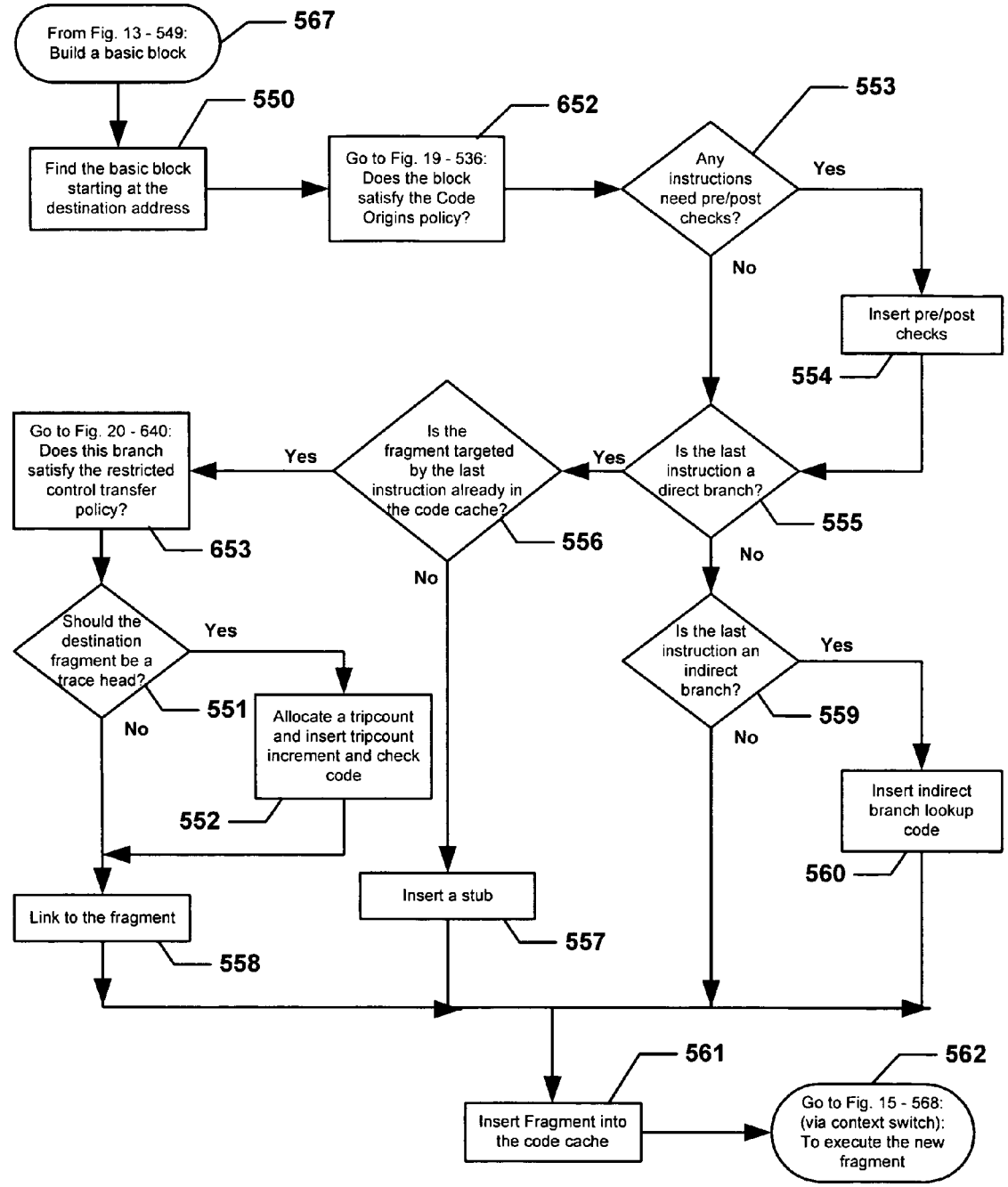
FIG. 14 is a flow chart describing the Block Builder of the embodiment in FIG. 12.

FIG. 14: Block Builder

FIG. 14 is a block diagram that describes the process of building a basic block in the basic block cache. The basic task for the Block Builder is to copy a sequence of consecutive instructions starting at the input target address and stopping at a branch instruction. In addition, the Block Builder may modify some instructions and add in others. It is also part of the trace building process. The block builder is crucial in enforcing Sandboxing, since it adds in the associated pre and post checks. It also verifies the Code Origins policy and the Restricted Control Transfer policy.

The Block Builder gets passed in a target address via (567) which it first uses to construct a block starting at that address (550). It then asks the Enforcement Processor to check that the Code Origins policy is satisfied for that new block (652). Next at (553) the system checks the block for any instructions that require pre or post un-circumventable sandboxing checks and, if needed, inserts the checks at (554). The system then checks the final branch instruction in the block (555). If it is an indirect branch (559), the system inserts indirect branch lookup code (560) at the end of the block, inserts the block into the Code Cache (561) and then tells the Code Cache to start executing this new block (562). If it is a direct branch (555) and the target is not in the Code cache (556), the system places an exit stub at the end of the block (557). The stub ensures that this new target address will get processed later. If the target is a block already in the Code Cache, it calls the Enforcement Processor to verify the restricted control transfer policy (653). If that passes, at (551) the system checks if this block should be a trace head. If so, at (552) it allocates a trip count location and inserts trip count increment and check code. Finally, since this address has been verified as passing the restricted control transfer policy, the system makes a direct link from the new fragment to the existing one (558). In any case, the system concludes by inserting the block into the Code Cache (561) and telling the Code Cache to start executing the new block (562).

FIG. 15: Code Cache

FIG. 15 is a block diagram that describes the actions carried out in the code cache, which comprises both the basic block cache and the trace cache. This diagram also includes the indirect branch lookup component. This depicts the main execution loop in the steady state when the working set of the application is in the code cache and there are no abnormal control transfer requests.

When the Monitor Processor decides to execute a block or fragment, it sends a request to the Code Cache along with a reference to the fragment to be executed. If the Monitor does not have a block reference, it first calls the Block Builder (FIG. 14) to obtain one. The Code Cache then obtains via (568) the fragment or block at (510) and goes to the Trace Checker at (527) to take care of possible trace building described in FIG. 16. Then at (516) the Code Cache directs the Execution Processor (FIG. 18) to execute the indicated fragment with the following possible exit outcomes indicated at (520):

1. The block execution reaches a stub at (523) via the choice at (521), in which case instruction information is saved (522) and execution goes through a context switch (569) to the Monitor Processor at 565 in FIG. 13, which deals with this case.
2. The block execution reaches a direct branch to another fragment, the upward path from (523), in which case control just passes directly to that fragment as if it were starting a block directly from the Monitor Processor.
3. The block execution reaches code that looks up an indirect branch target at (243) also via the choice at (521), which further consists of the actual lookup of the target address (526). If the target address is in the table (528), the code passes control to the fragment reference from the table, as in case 2. If the target address is not in the table, execution returns back through a context switch (586) to the Monitor Processor at 563 in FIG. 13.

Figure 16:
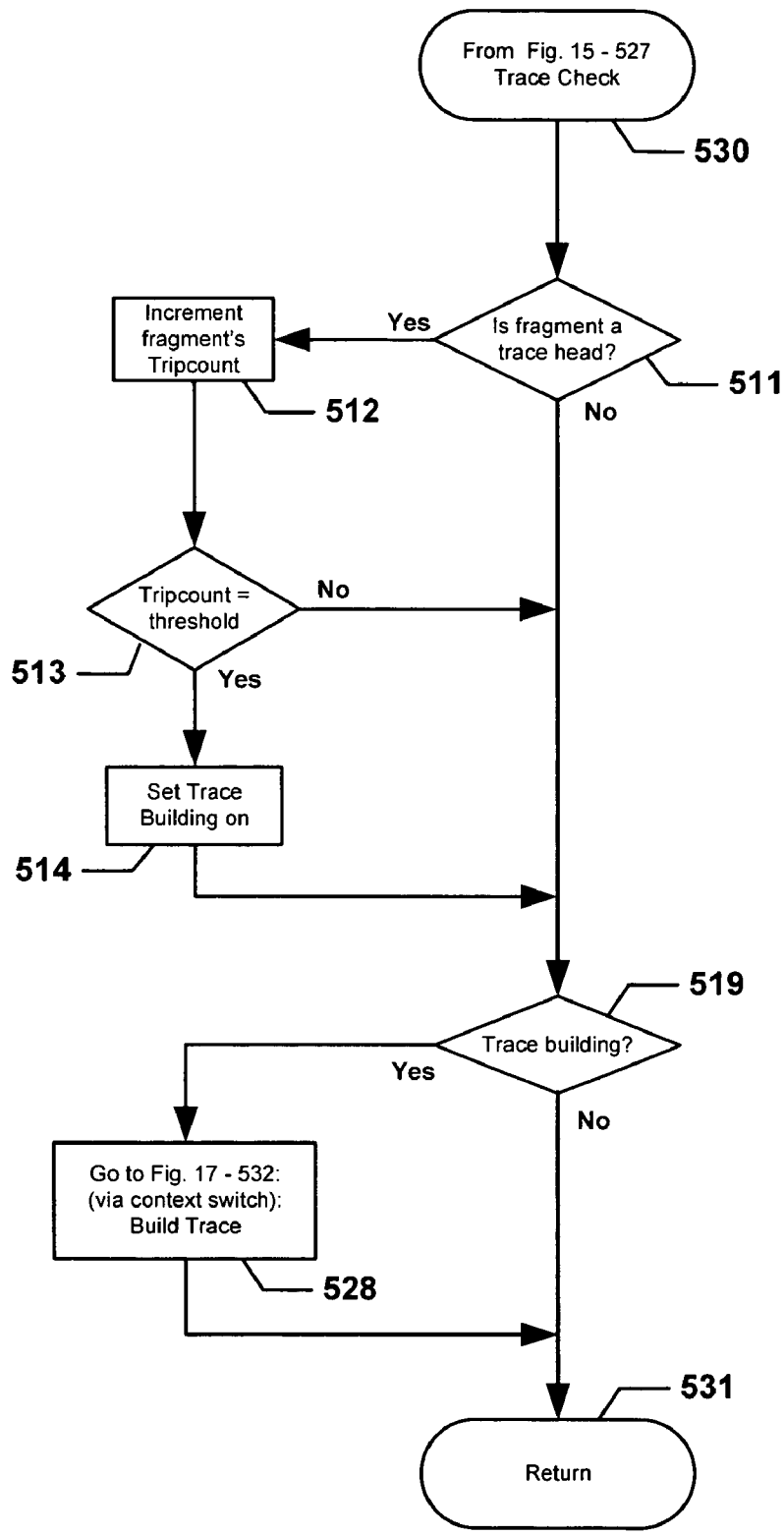
FIG. 16 is a flow chart describing the Trace Check of the embodiment in FIG. 12.

FIG. 16: Trace Check

FIG. 16 is a flow chart that describes the process of identifying when a trace should be built. This requires some bookkeeping at candidate trace heads. When a hot path is detected at a trace head, building of a new trace is started.

Traces are sequences of basic blocks that can execute one after another without going back to the Monitor Processor and incurring a context switch. The creation of a trace is begun by finding a block to start the trace with, called a trace head. The system comes in via (530) and determines if the block is a trace head at (511) and if so, does a trace setup—just below. One way of determining if a block is a trace head is if it is the target of a backward branch or the target of an exit from an existing trace.

The trace set up is as follows:

Increment the block trip count at (512); and

If the trip count has reached its threshold (513), turn trace building on (514).

Figure 17:
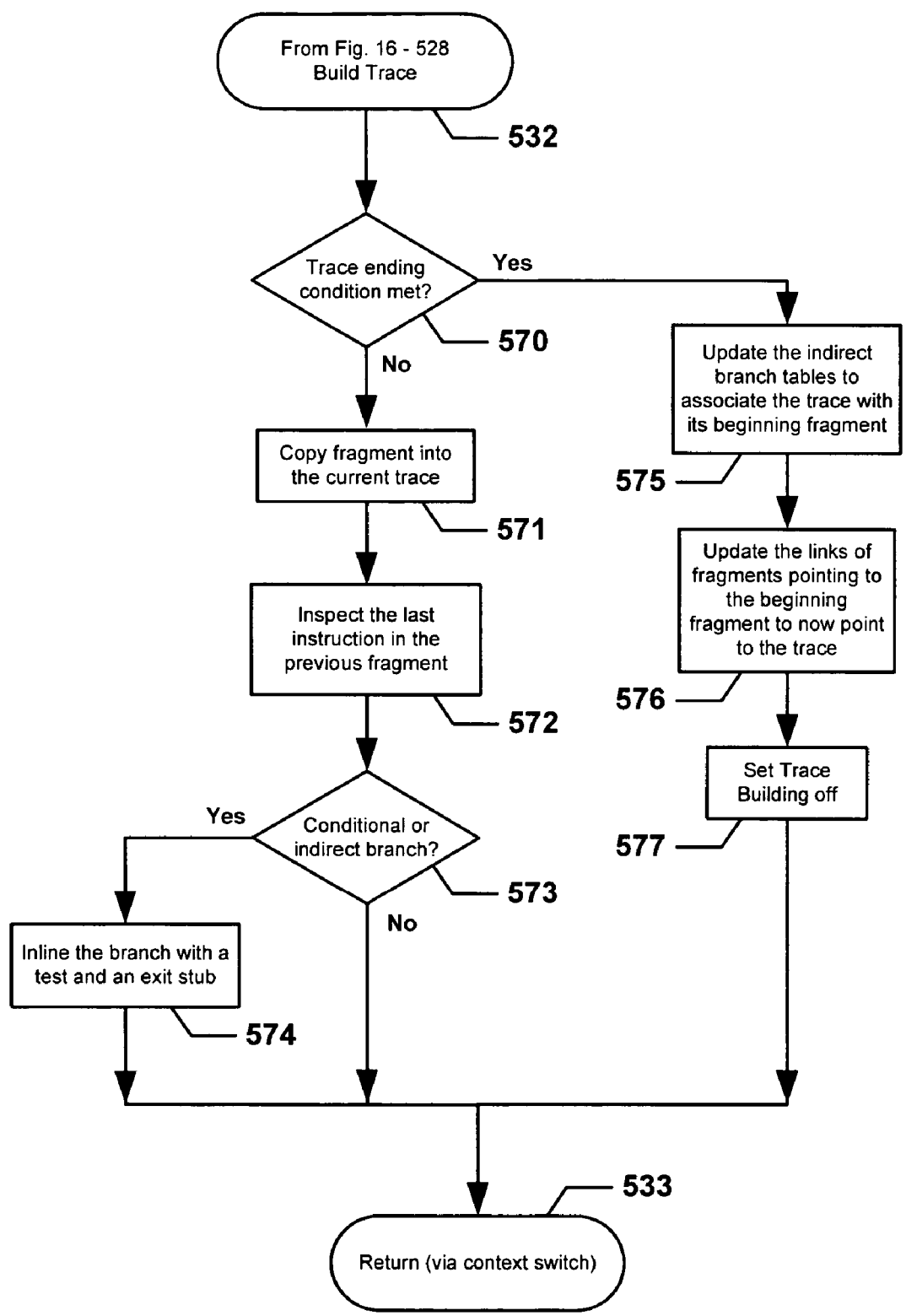
FIG. 17 is a flow chart describing the Trace Builder of the embodiment in FIG. 12.

If trace building is turned on at (519), the system, at (528), goes to the Trace Builder (FIG. 17). Finally, the system returns from the Trace Check (531).

FIG. 17: Trace Builder

FIG. 17 is a block diagram that describes the process of building a trace. A trace is built simultaneously while executing the identified hot path. When a trace ending condition such as a backward branch or start of another trace is detected the current trace is terminated. When building a trace, the system connects a basic block that ends in an indirect branch by inserting a check to ensure that the actual target of the branch will keep execution on the trace. This check is much faster than the hash table lookup, but if the check fails the full lookup must be performed. The superior code layout of traces goes a long way toward amortizing the overhead of creating them.

From the Code Cache the system enters this subsection via (532) with the goal of copying a block to the Trace Cache. This starts with a determination of whether the trace ending condition is met (570). One way to determine the end of a trace is if the final branch of the fragment is a back branch or if it goes to another trace or a trace head. If it is not a trace end, it copies the fragment into the current trace (571) and inspects the last instruction in the previous fragment (572). If that is a conditional branch or an indirect branch (573), it inlines a test with an exit stub (574). For a conditional branch, the test is the condition. For an an indirect branch, the test determines if the current target of the indirect branch stays on the trace. If it is a trace end at (570), the system first (575) updates the indirect branch tables to associate the trace with the beginning fragment. Then it updates the links of fragments pointing to the beginning fragment so that they now point to the trace instead (576). It then turns trace building off at (577). Finally the system returns back to the code cache with the fragment copied to the trace cache (533).

Figure 18:
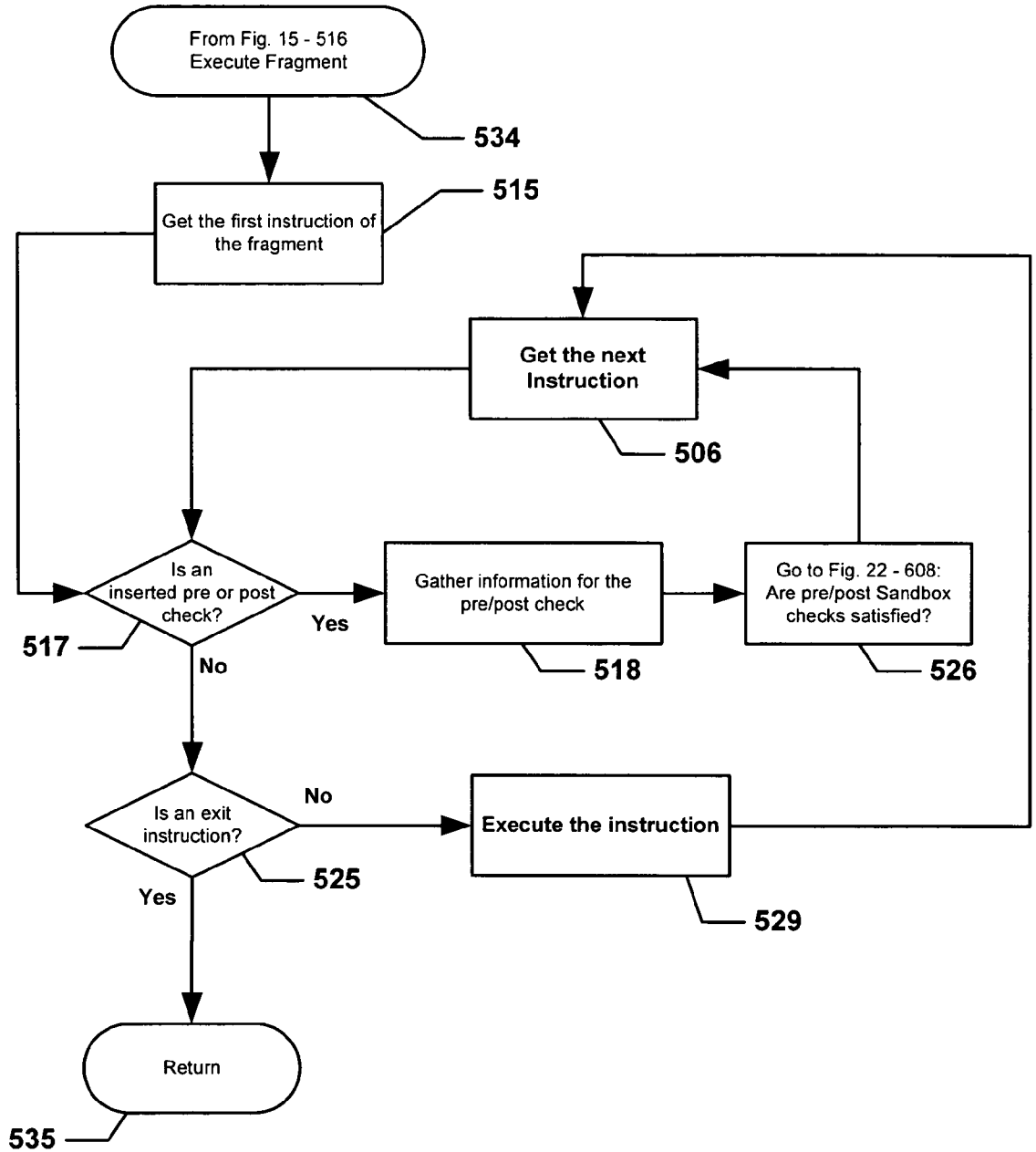
FIG. 18 is a flow chart describing the Execution processor of the embodiment in FIG. 12.

FIG. 18: Execution Processor

FIG. 18 is a flow chart of the execution processor which executes basic blocks or traces. The execution processor also performs the un-circumventable sandboxing. Execution of the instructions that do not impact the security checks or operation of the code cache is done natively for speed. However, instructions can also be simulated or emulated. The Execution Processor executes a block or a trace. The Block and Trace Builders have constructed their respective blocks and traces so that the process is automatic once it is started. The diagram here is designed to show what happens within that execution process, specifically how the pre and post checks are performed. The execution of the "next instruction" is, of course, automatic with a native execution processor.

Execution begins at (515), via (534), with the first instruction in the fragment. As the fragment executes it may reach code that was inserted in the fragment by the system. Such code includes semantic Sandboxing checks before and after system calls as well as exit instructions. If block execution reaches checking code previously inserted before or after a system call, this is indicated by (517). At (518) the checking code gathers information for the particular check and transfers control back to the Enforcement Processor at (526), which either returns to continue executing the next instruction, via (506), in the remainder of the block or if the checks have failed, it does not return. At (525) if execution reaches an exit instruction, the system returns (535). Otherwise, the current instruction is executed at (529), the next instruction is fetched at (506) and the process repeats at (517).

Figure 19:
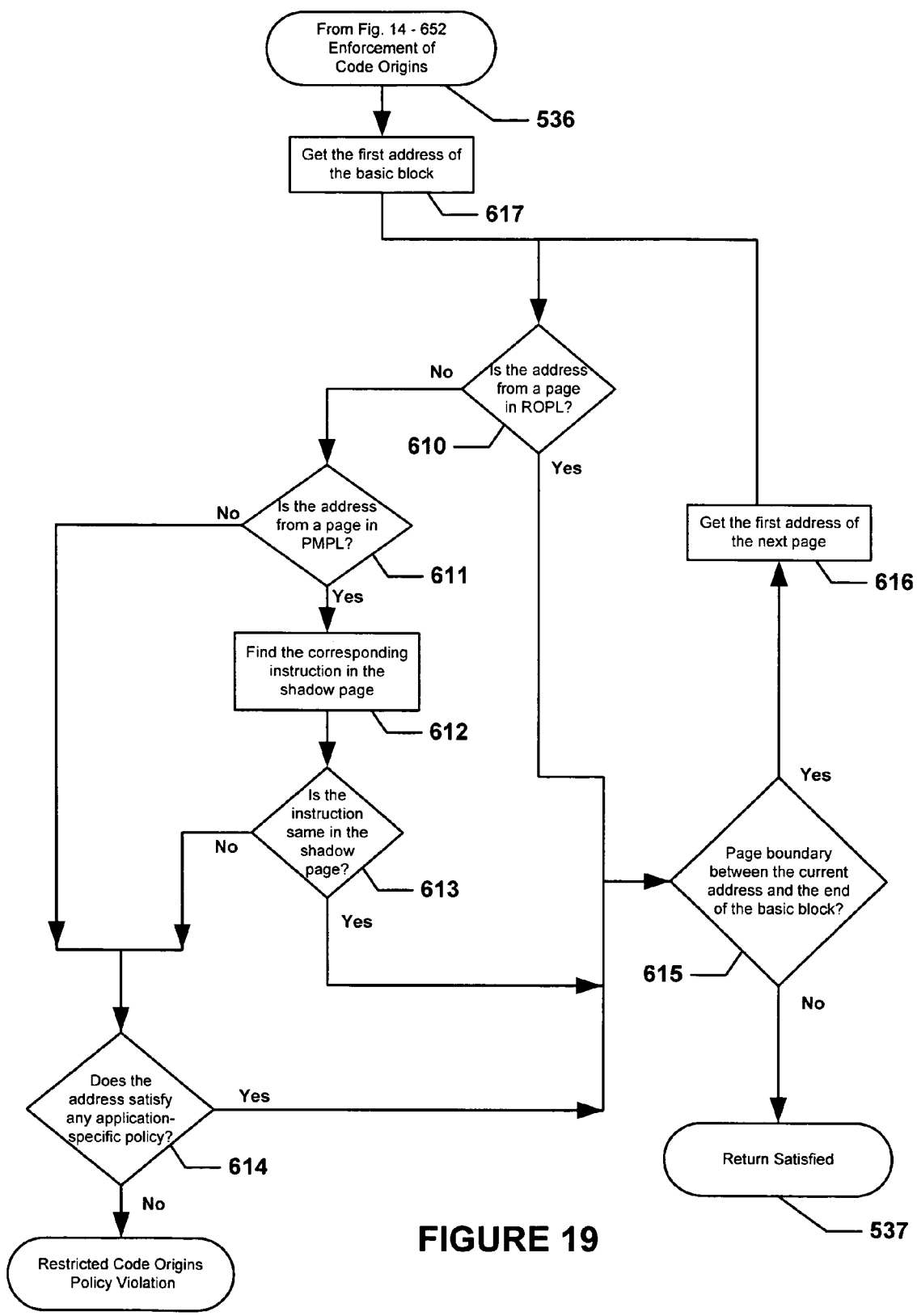
FIG. 19 is a flow chart describing the Enforcement of Code Origins of the embodiment in FIG. 12.

FIG. 19: Code Origins

FIG. 19 is a flow diagram that describes the enforcement of the selected code origins test in the Enforcement processor. The implemented code origins test closely resembles rule #2 with the relaxation described in rule #3. There is also support for rule #5. The basic idea here is to identify code that is trusted and to put such code under hardware write-protection, which is usually only available at a page level. Such trusted and protected code is then used as the source for building basic blocks.

Because a page can sometimes contain both code and data, it is possible to have legitimate writes to code pages. In that case, the system needs to allow the write while still preserving the integrity of the code that is on the same page. This is accomplished by creating a read only copy of the code page, called the shadow page, before the write is done.

The system uses the following data structures:

ROPL: Read Only Page List—all loaded code is protected at a page level and such pages are placed on this list. Such code includes initially loaded program code as well as code from dynamically loaded libraries. Unloaded libraries, of course, are removed from the list when they are unloaded.

PMPL: Partially Modified Page List—all ROPL pages that have been modified are placed on this list. Each page on this list has a protected shadow page, which is used as the source for creating basic blocks. After the write is allowed to occur, the system must verify that no code was modified. If the relevant code on the two pages is the same, then the write did not modify the code in the particular block we are concerned about.

The Monitor provides an address at (617), via the entry at (536), for the purposes of verifying the validity of the code starting there. If the address is on a page in the ROPL (610), then it is trusted. The system then does one further check at (615) to see if there is a memory page boundary between the current address and the end of the current block. If so, the system gets the address of that next page at (616) and restarts the process at (610). If not, the system returns that the check was satisfied (537). If the address was not from a ROPL page, then the system determines if the address is on a PMPL page at (611). If so, the system compares (613) the instruction at the address in the PMPL page with the corresponding instruction in the shadow page, found at (612). If they are the same, it means that no code from this block has been modified so the system proceeds with (615) as above. If the address is not from a page in PMPL or the comparison fails, the system checks for an application-specific override policy at (614). If there is one and it is satisfied, the system proceeds to (615). Otherwise, it signals a policy violation.

Figure 20:
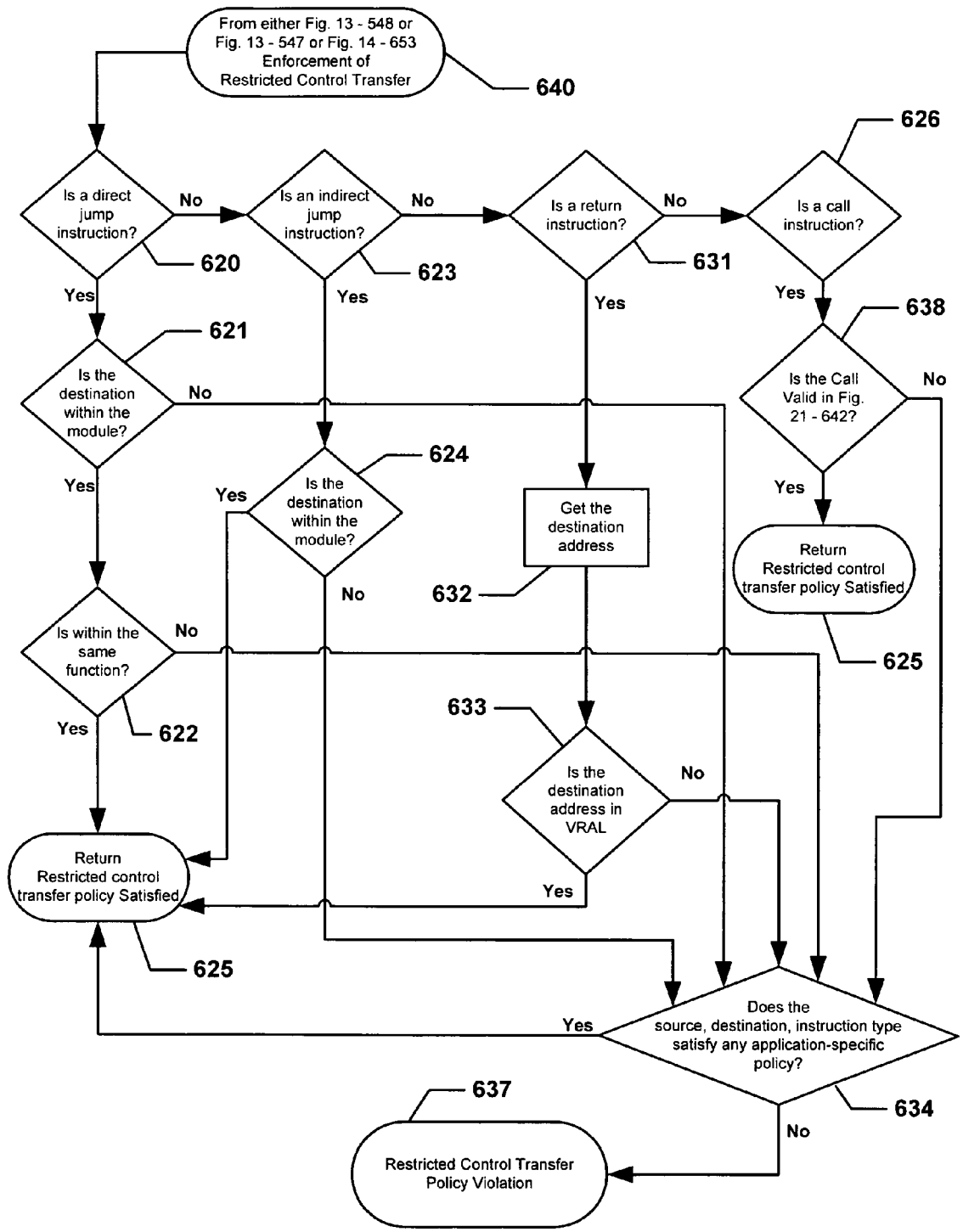
FIG. 20 is a flow chart describing the Enforcement of Restricted Control Transfer of the embodiment in FIG. 12.

FIG. 20: Restricted Control Transfer

FIG. 20 is a flow chart that describes the restricted control transfer rules that were implemented in this embodiment to demonstrate the general concept of restricting control transfer. Activity of this diagram belongs to the enforcement processor. The code cache infrastructure makes monitoring control flow transfers very simple. For direct branches, the desired security checks are performed at the point of basic block linking. If a transition between two blocks is disallowed by the security policy, they are not linked together. Instead, the direct branch is linked to a routine that announces or handles the security violation. These checks need only be performed once for each potential link. A link that is allowed becomes a direct jump with no overhead.

There are three types of control transfers that can occur during execution in the Code Cache: a direct branch, an indirect branch (with specific cases indirect call, indirect jump, and return) and non-explicit control flow. Indirect control transfer policies add no performance overhead in the steady state, since no checks are required when execution continues on the same trace. Otherwise, the hash table lookup routine translates the target program address into a basic block entry address. A separate hash table is used for different types of indirect branch (return instruction, indirect calls, and indirect branches) to enable type specific restrictions without sacrificing any performance. Security checks for indirect transfers that only examine their targets have little performance overhead, since the system places in the hash table only targets that are allowed by the security policy. Targets of indirect branches are matched against dynamically resolved DLL entry point symbols to enforce restrictions on inter-segment transitions. Targets of returns are checked to ensure they target only instructions immediately following call sites.

Finally, Shepherding must handle non-explicit control flow such as signals and Windows-specific events such as callbacks and exceptions. It places security checks at the interception points, similarly to indirect branches. These abnormal control transfers are rare and so extra checks upon their interception do not affect overall performance. For this determination there are four cases beginning from (640):

1. Direct Jump (620): The system determines whether the transfer destination is within the module (621) and whether the destination is within the current function (622). If either is determined to be false, the system proceeds to (634). Obviously if the transfer destination is not in the same module, then the destination is not in the same function. So the policy selection here is that transfers must be within the same function.
2. Indirect Jump (623): The system determines whether the transfer origin and destination are within the same module (624). If not, the system proceeds to (634).
3. Return Instruction (631): This is satisfied if the return address (from 632) can be used to look up an address in the Valid Return Address List, VRAL (633), which is updated by the Block Builder via FIG. 21. This is an efficient way to determine if the found call has actually been previously executed. There a number of embodiments known in the art that could be used here to validate a return instruction. This test verifies that the return destination was a proper one, but is not necessarily the immediately previous one. A more accurate test requires keeping a parallel stack of return addresses per thread to check against.
4. Call Instruction (626): Here, at (638), the system goes to the Call validity check on FIG. 21.

If the policies in the above cases are valid, the system returns with the Restricted Control Transfer policy satisfied at (625). For any failing case above, the system goes to (634) and does a final check for any application-specific override policy that is satisfied. If there is none that is satisfied, at (637) the system signals a Restricted Control Transfer policy violation.

Figure 21:
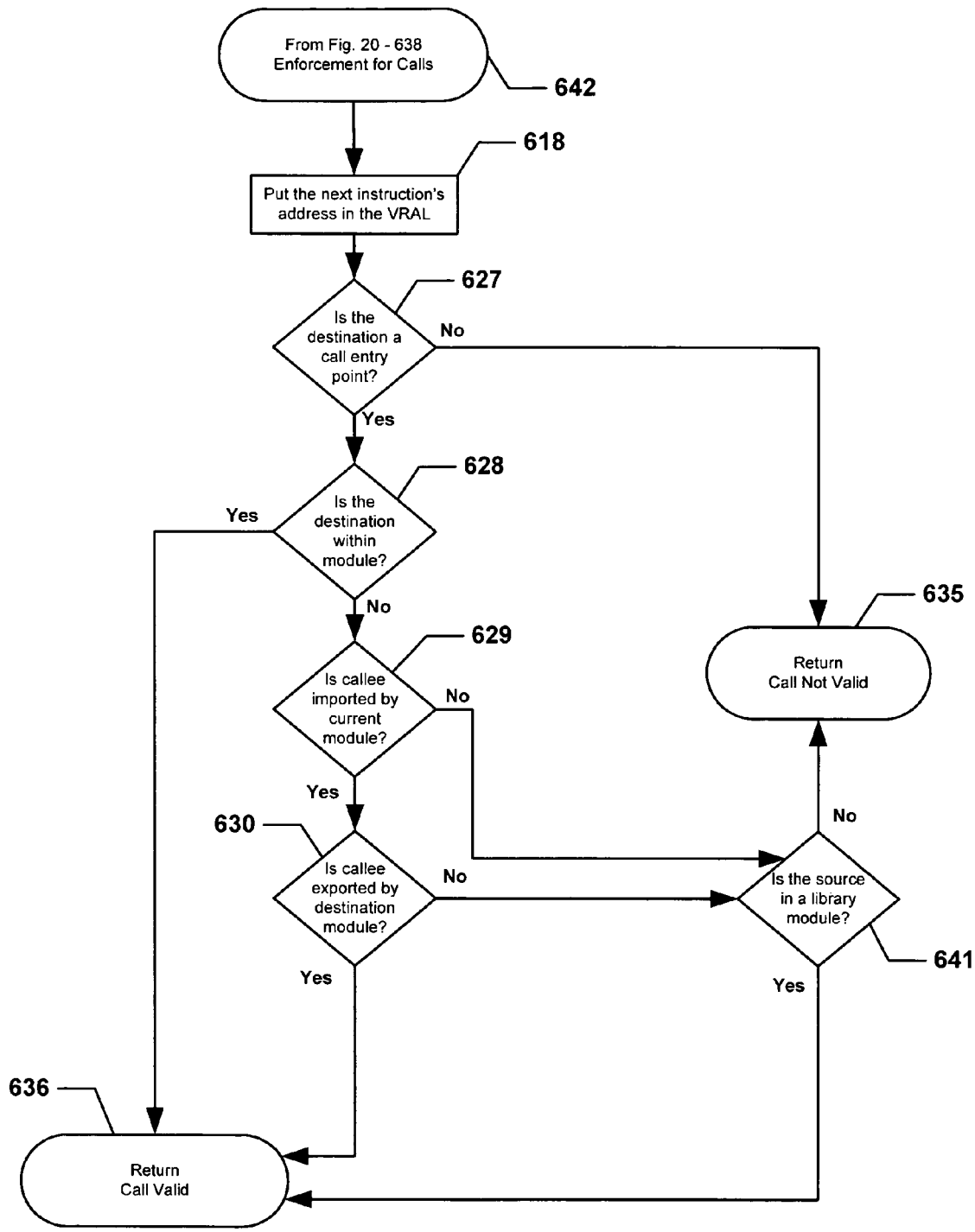
FIG. 21 is a flow chart describing the Enforcement of Restricted Control Transfer of Calls of the embodiment in FIG. 12.

FIG. 21: Restricted Control Transfer—Calls

FIG. 21 is a flow chart that expands on the set of rules that restricts the control transfer by call instructions. This section handles checking policy for calls, entering at (642). The following is used for return destination validation, as described above: VRAL: Valid Return Address List—keeps valid return addresses.

First the system updates the VRAL with the address of the instruction following the call at (618). If the target is a call entry point (627) and the target is within the same module (628), then the policy is satisfied at (636). Otherwise, despite that, if the callee is imported by the current module (629) and exported by the target segment (630), then the policy is satisfied also at (636). If not, if the source is a library module (641), then the policy is satisfied (636). This adds support for callback functions passed to library routines. In all other cases, at (635) the system returns that the call is not valid.

Figure 22:
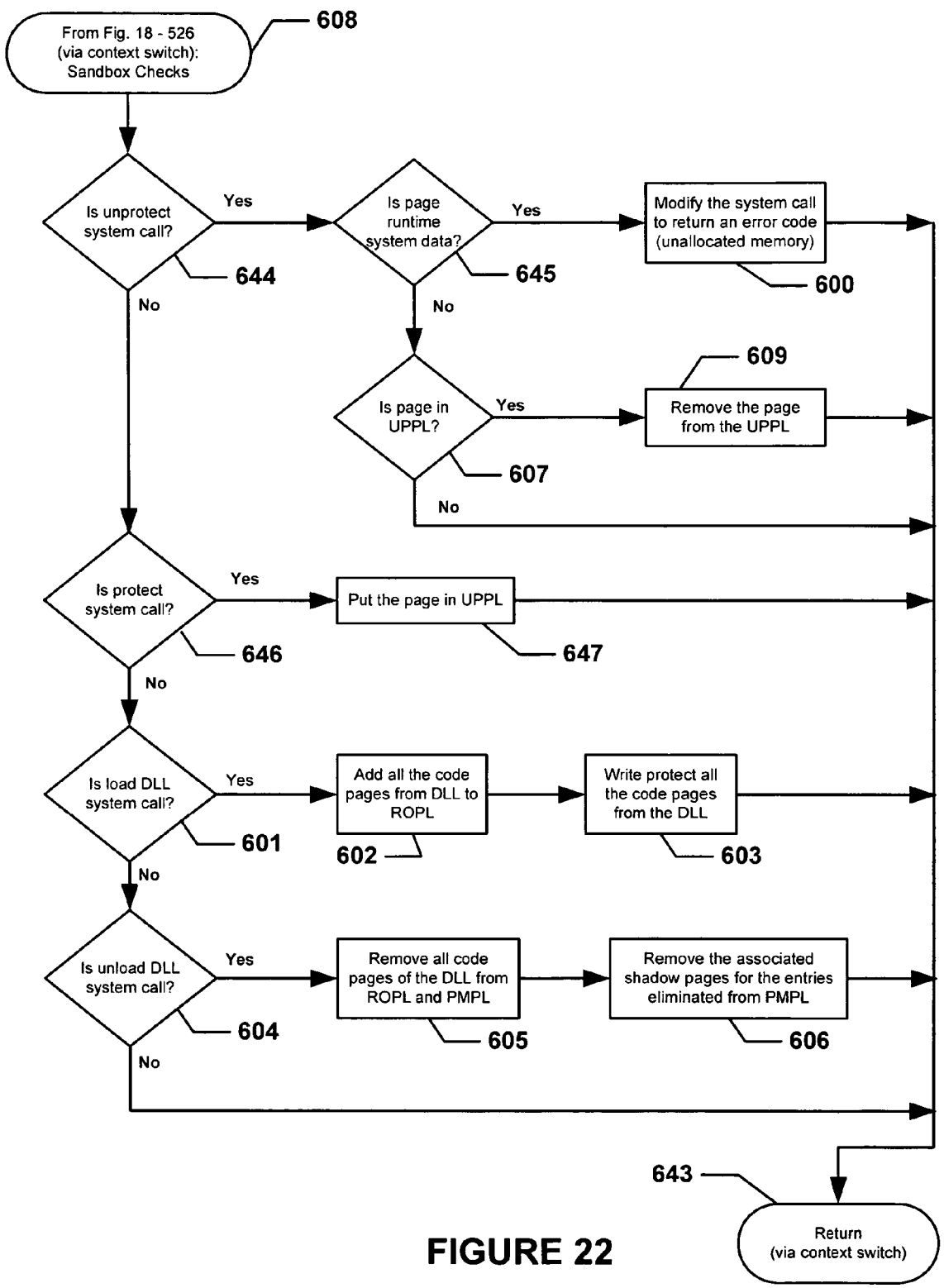
FIG. 22 is a flow chart describing the Enforcement of Un-Circumventable Sandbox Checks of the embodiment in FIG. 12.

FIG. 22: Un-circumventable Sandbox Checks

FIG. 22 describes the un-circumventable sandboxing operations performed on system calls. Sandboxing these system calls is necessary to implement the restricted code origins policy. There may be other system calls that need to be sandboxed to support the code cache implementation.

When required by the security policy, Program Shepherding inserts sandboxing into a code fragment when it is copied to the Code Cache. In normal sandboxing, an attacker can jump to the middle of a block and bypass the inserted checks. Program Shepherding only allows control flow transfers to the top of basic blocks or traces in the Code Cache, preventing this.

An indirect branch that targets the middle of an existing block will miss in the indirect branch hash table lookup, go back to Program Shepherding, and end up copying a new basic block into the Code Cache that will duplicate the bottom half of the existing block. The necessary checks will be added to the new block, and the block will only be entered from the top, ensuring that the security policy is followed. When sandboxing system calls, if the system call number is determined statically, the system avoids the sandboxing checks for system calls it is not interested in. This is important for providing performance on applications that perform many system calls. Restricted Code Cache entry points are crucial not just for building custom security policies with un-circumventable sandboxing, but also for enforcing the other shepherding features by protecting Program Shepherding itself.

This section uses the following data structure: UPPL: User Protected Page List. The operations on the UPPL in this diagram keep it up-to-date. The purpose of the UPPL is to assist in properly distinguishing write exceptions, as described in the next diagram, FIG. 23.

The primary entry here at (608) is from the Code Cache to carry out sandbox checks. Each Sandbox check is associated with a system call. All program code pages are write-protected and kept on a Read-Only Page List, ROPL. If a write is made to such a page, the system allows the write, but beforehand it makes a write-protected shadow copy.

First the system sees if the system call for these checks is going to turn off write-protection (644). Such protection is on a page basis. If so, in (645) it checks if the page includes data for the runtime system? If so, it modifies the system call at (600) so it will return an error at runtime if this code is executed. Otherwise if the page does not contain system data, the system checks at (607) if the page on the User-Protected Page List, UPPL. If not, the check is satisfied. Otherwise, at (609) the system removes the page from the UPPL. If the system call is going to turn on write-protection for a page (646), then the system adds such pages to the UPPL (647). If the system call is a load of a DLL (601), the system adds all the code pages of the loaded DLL to the read-only page list (602) and then write-protects all such pages (603). If the system call is an unload DLL (604), the system removes all corresponding code pages from both the read-only page list, ROPL, and the partially modified page list, PMPL (605). Finally, at (606), the system removes all the associated shadow pages for the PMPL entries eliminated in (605). At the end (643), the system returns.

Figure 23:
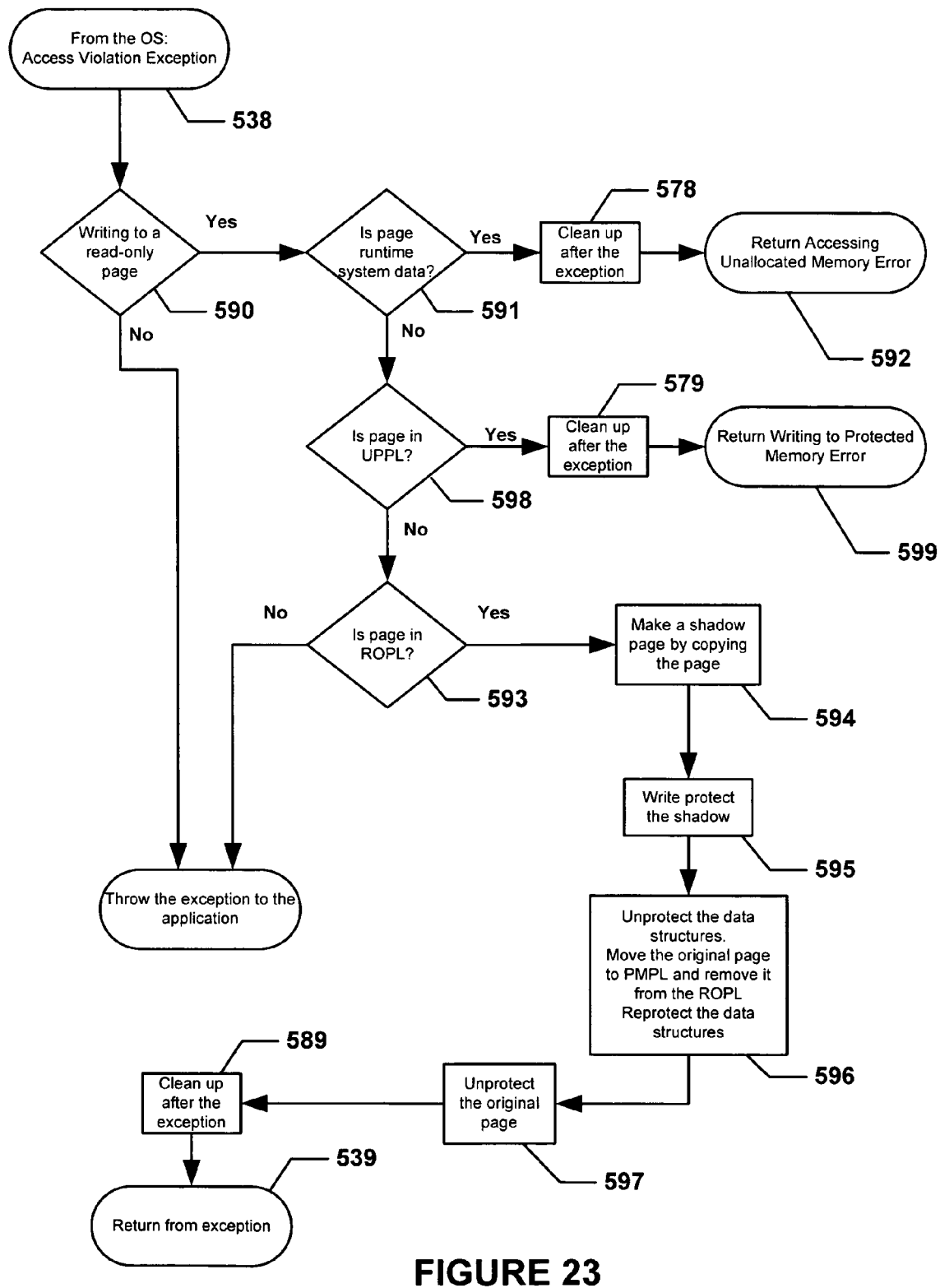
FIG. 23 is a flow chart describing the Sandboxing Exceptions of the embodiment in FIG. 12.

FIG. 23: Sandboxing Exceptions

FIG. 23 is a flow diagram of sandboxing access violation exceptions. This is an example of how to sandbox an exception handler. Other exception handlers may need to be sandboxed to support the integrity of the code cache and the enforcement of the security policies. As shown here, the UPPL and the ROPL assist in distinguishing different types of write exceptions.

This module is entered through an OS exception handler (538) when an access-protection violation occurs. The handler checks if the exception was for a write to a read-only page (590). If not, the check is satisfied and the system throws the exception to the application Otherwise, the system determines if the write was to a page containing runtime system data (591). If so, at (578) it cleans up after the exception and at (592) returns an error for accessing unallocated memory. If (591) is not true, at (598) the system sees if the page in question is in UPPL. If so, at (579) it cleans up after the exception and at (599) returns an error for writing to protected memory. If (598) is not true, the system determines if the page is in the ROPL at (593). If not, the system throws the exception to the application. Otherwise, the page is on the read-only list, ROPL. The system makes a shadow copy of the page (594), write-protects the shadow (595), unprotects the ROPL and PMPL lists, moves the original page from the ROPL to the partially modified page list, PMPL, re-protects the ROPL and PMPL (596), and turns off the page's write-protection (597). The system then proceeds to (589) to finish (539) by returning. This allows the original page to contain data that is modified. If the Block Builder goes to copy code from an address on the original page, it uses the write-protected shadow page instead.

Figure 24:
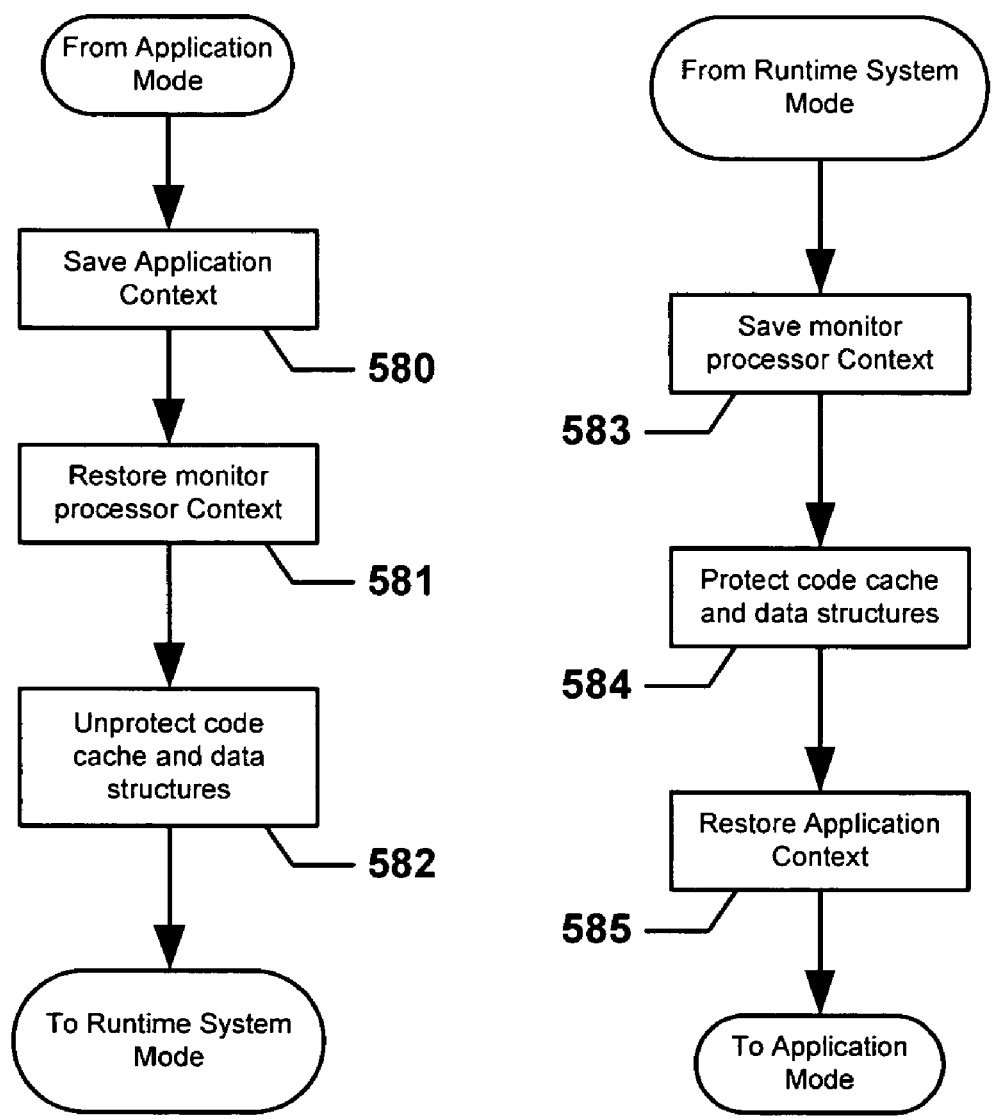
FIG. 24 is a flow chart describing the Context Switch of the embodiment in FIG. 12.

FIG. 24: Context Switch

FIG. 24 is a block diagram of the context switch that is performed when control is transferred from (to) application mode to (from) runtime system mode. Context switching is a common operation that is necessary when transferring control from one execution context to another. Basically, one needs to save the current context, so it will be available to restore later, and then restore the target context that was saved at some point previously.

In transferring control from the Code Cache the system does a context switch consisting of the following:

Save application context (580). [Consisting of the registers, condition codes etc.]
Restore Monitor Processor context (581).
Turn off write-protection for the Code Cache and for the data structures associated with the Monitor and Enforcement Processors (582). There are many different methods of implementation, mainly using the various protection mechanisms provided by the hardware.

In transferring control from the Enforcement or Monitor Processors to the Code Cache the system does a context switch consisting of the following:

Save Monitor Processor context (583).
Turn on write-protection for the Code Cache and for the data structures associated with the Monitor and Enforcement Processors (584).
Restore application context (585).

Execution Model Enforcement

The system can also use static and dynamic analyses to automatically build a custom security policy for a target program that specifies the program's execution model. This process requires no user interaction, but is able to build a strict enough policy to prevent all deviations from the program's control flow graph and nearly all violations of the calling convention, greatly reducing the possibility of an unintended program action.

The execution model of a program includes several components. At the lowest level, the Application Binary Interface (ABI) specifies the register usage and calling conventions of the underlying architecture, along with the operating system interface mechanism. Higher-level conventions come from the source language of the program in the form of runtime data structure usage and expected interaction with the operating system and with system libraries. Finally, the program itself is intended by the programmer to perform a limited set of actions.

Even the lowest level, the ABI, is not efficiently enforceable. The underlying hardware has no support for ensuring that calls and returns match, and it is prohibitively expensive to implement this in software. For this reason, the execution model is a convention rather than a strict set of rules. However, most security exploits come from violations of the execution model. The most prevalent attacks today involve overwriting a stored program address with a pointer to inject malicious code. The transfer of control to that code is not allowed under the program's execution model. Enforcing the model would thwart many security attacks.

FIG. 25: Call Matching

FIG. 25 includes three flow charts (25A, 25B and 25C) that describe how to keep a hash value in order to verify that the stack discipline has not been violated. In order to implement this restricted control transfer rule, the call and return instructions need to be sandboxed to carry out the actions described in these flow charts. The first flow chart describes how to initialize the data structures.

A number of attacks have been constructed out of various function calls by improperly manipulating return addresses. Such attacks violate the standard matching of calls and returns. FIG. 25's call matching approach uses a simple symmetric encryption scheme, where an input value is encrypted at a call using a call-site-specific key, while that same key is used to decrypt the encrypted value at a return. If the call and return match up properly, the input value comes out unchanged afterwards.

At the start of a program the system (710) calculates a random key for each call site in the program. It also derives a random hash value that is saved for later use (711). This hash value will be invariant if all checked calls and returns match up properly. Before a call site, the system determines if checking is enabled for that site (712). If so, the system stores the previously saved hash value in a call-site specific location (713) and optionally protects it. In any case, if checking is enabled for this site, at (714), the system encodes the hash value using the call-site-specific key and stores the resulting value in the call-specific location. After a call instruction, at (715) it decodes the saved value using the call-specific key and puts it back in the site-specific location. If checking is enabled at this site (716), the system compares the current hash value with the stored one (717). If they are the same, the program has returned to the same function that executed the previous call. Note that the final check can be carried out at any time, such as just before security sensitive system calls.

Figure 26:
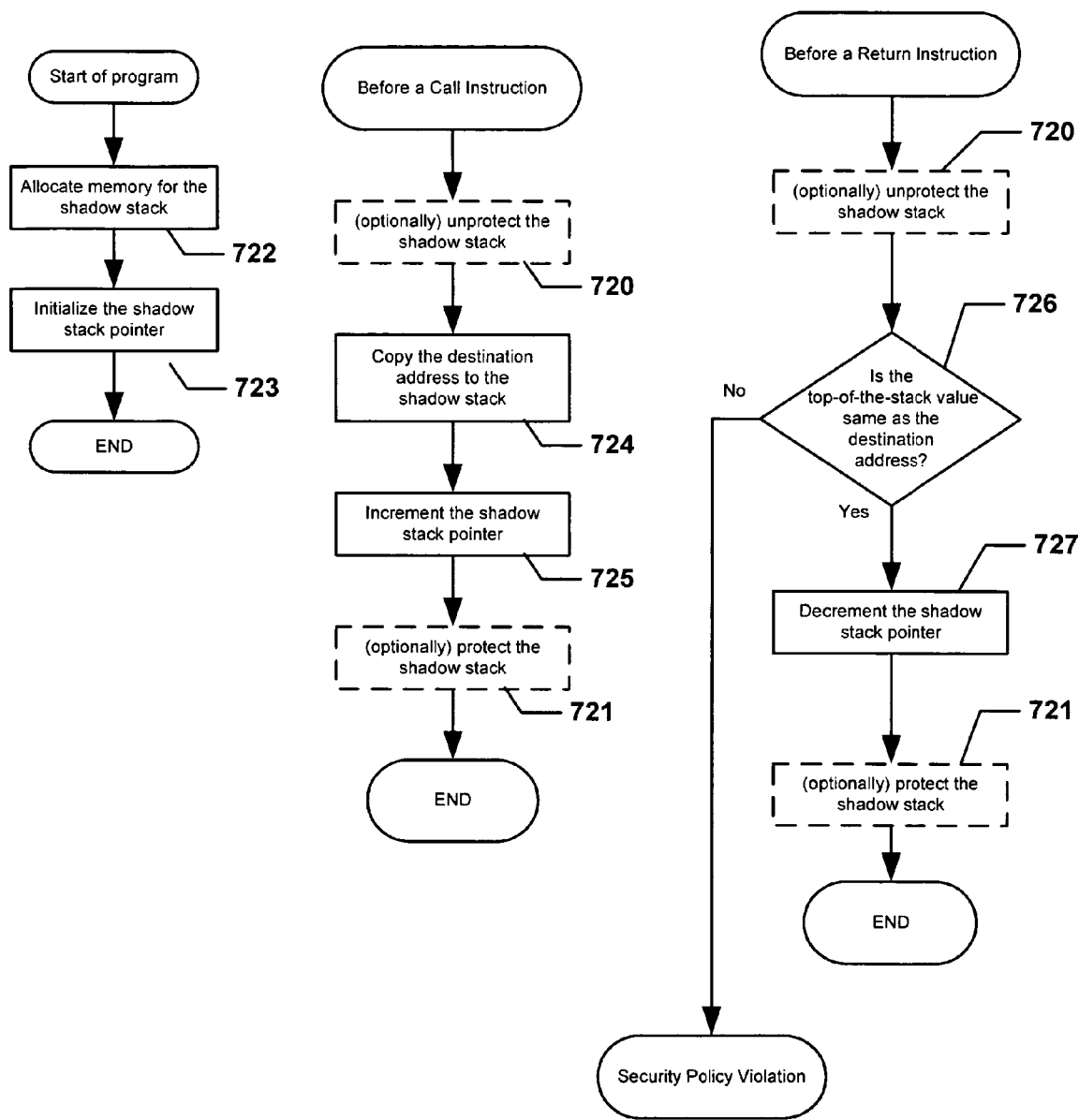
FIG. 26 is a flow chart describing Restricted Control Transfer stack discipline enforcement rule implemented using a shadow stack in memory.

FIG. 26: Stack-Based Return Protection

FIG. 26 includes three flow charts that describe how to enforce the stack discipline using a separate shadow stack. In order to implement this restricted control transfer rule, the call and return instructions need to be sandboxed to carry out the actions described in these flow charts. The first flow chart describes how to initialize the data structures.

Function calls follow a fixed protocol where a return value, i.e., the address following the call, is saved on the runtime stack so that when the function ends it can get back to where it came from. This is typically done by executing a return instruction that jumps to the return address saved on the runtime stack. Because of its location near user data, this saved return value on the stack is vulnerable to improper modification. One way to prevent this is to additionally save the return value in a shadow stack in a separate location away from any user data. The two values from both stacks should never be different.

At the start of a program the system (722) allocates memory for a shadow stack and then initializes a stack pointer for it (723), which points to the first available location in the shadow stack. Before a call instruction, the system unprotects the shadow stack, if needed (720), copies the return address to the shadow stack (724), increments the shadow stack pointer (725) and optionally re-protects the shadow stack (721). Before a return instruction, the system unprotects the shadow stack, if necessary (720), and checks if the top of shadow stack address matches the return destination address (726). If not, there is a security violation. Otherwise, the system decrements the shadow stack pointer (727) and optionally re-protects the shadow stack (721).

Figure 27:
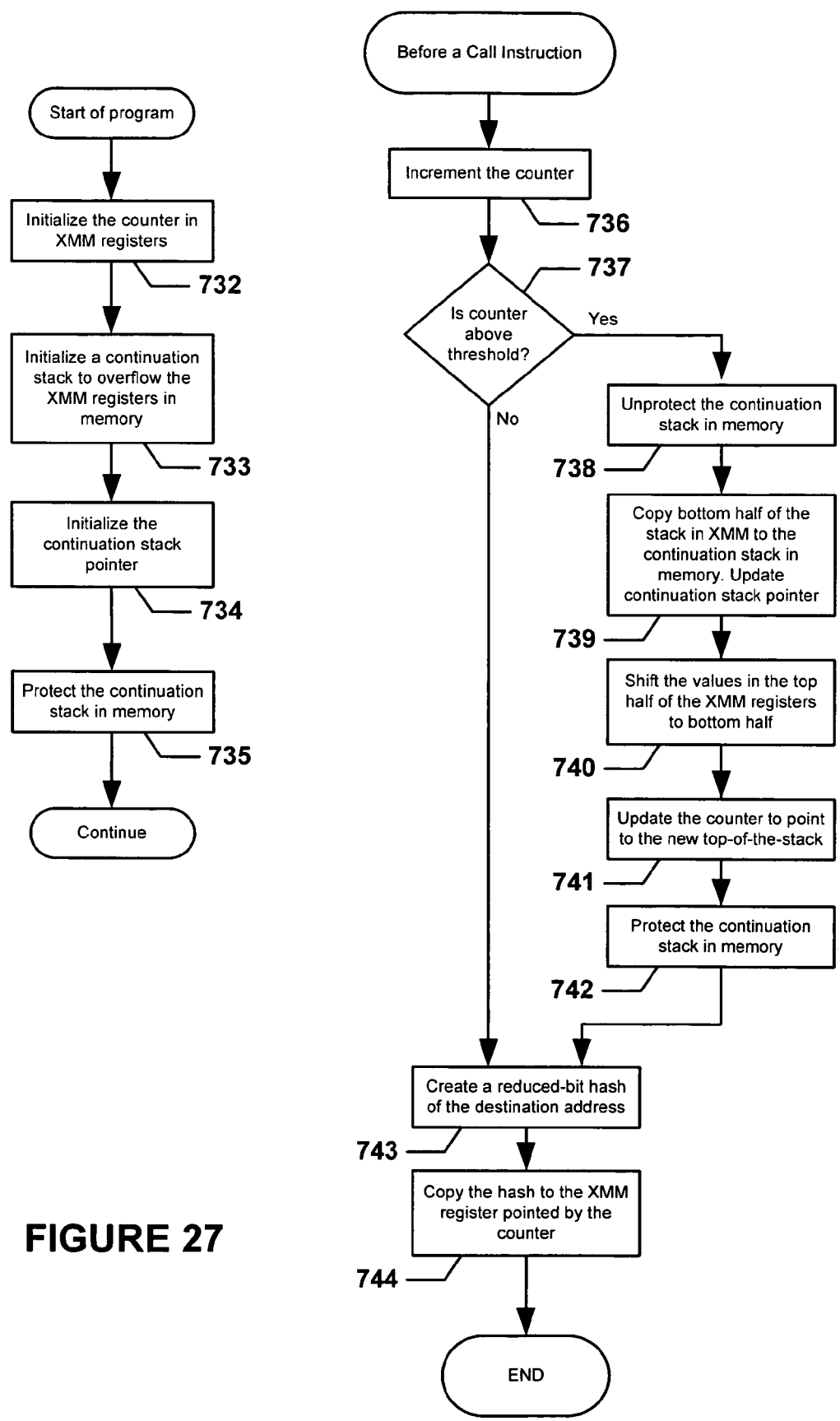
FIG. 27 is a flow chart describing Restricted Control Transfer stack discipline enforcement rule implemented using a shadow stack in the XMM registers as a fixed buffer.

FIG. 27: Return Protection Using XMM Registers as a Buffer

FIG. 27 includes flow charts that describe how to enforce the stack discipline using a separate shadow stack that is optimized using the XMM registers. The XMM registers are used as a buffer to store the top elements of the stack. This speeds up the operations on the shadow stack without compromising the security of the stack.

The high-level idea here is to use hardware registers such as the XMM registers as the top of a stack that is used to save return values for the purpose of detecting stack tampering, as in FIG. 26 above. Use of the XMM registers provides more efficient stack operations, avoiding frequent reads and writes to memory and also taking advantage of parallelism within the processor. One embodiment of the system implements a call stack using the SIMD registers of the Pentium 4. The Pentium 4 SSE and SSE2 extensions add eight 128-bit registers (the XMM registers) that can hold single-precision, double-precision, or integral values. For a program that does not make use of these registers, they can be stolen and used as a call stack. The SSE2 instruction set includes instructions for transferring a 16-bit value into or out of one of the eight 16-bit slots in each XMM register. Unfortunately, storing a 32-bit value is much less efficient. However, just the lower 16 bits of return addresses are sufficient to distinguish almost all valid addresses. For a number of applications there are no return addresses that share their least significant 16 bits. Using just the lower 16 bits, then, does not sacrifice much security. It also allows twice as many return addresses to be stored in the register stack. The system further enhances this approach by hashing the 32-bit value and truncating the hash to 16 bits, called a reduced bit hash, to obtain the value to be placed in the XMM stack. The final 16-bit slot is used to store the counter indicating the location of the top-of-the-stack In the XMM registers, leaving room for 63 return address entries. Note that any other set of available registers for a particular processor model can be chosen. Furthermore, some components of FIG. 27 can be implemented in hardware.

On a call, the return address is stored in the XMM slot pointed at by the counter. When the end is reached (the $63^{rd}$ slot), the oldest 32 values are copied to a continuation stack in memory which is then protected and the rest of the slots are shifted down by 32 slots. When the index reaches 0, the most recent stored values are swapped back into the first 32 register slots and the index updated. Only copying half of the stack avoids thrashing due to a frequent series of small call depth changes. Expensive memory protection is only required on every call depth change of 32.

Please refer to FIG. 27. At the start of a program the system initializes the index counter in the XMM registers (732), initializes a continuation stack for saving the overflowed XMM registers in memory (733), initializes the stack pointer to the continuation stack in memory (734) and finally protects the continuation stack in memory (735).

Before a call instruction, the system increments the counter (736) and if the counter is above a threshold (737), the XMM stack is full. In order to make room in the XMM stack by flushing half of it to the in-memory stack, the system does the following:

Unprotect the continuation stack in memory, using an unprotect system call to change the permissions of the page containing the stack (738).
Copy the bottom of the XMM stack to the continuation stack, which is done by a series of store operations of the individual XMM register values into the memory locations of the continuation stack (739).
Shift the remaining values in the top of the XMM stack to the bottom of the XMM stack (740).
Update the index counter to indicate that the new top-of-the stack is now at the midpoint (741).
Protect the continuation stack in memory (742).

In either case, the system creates a reduced-bit hash of the destination address, i.e. the address following the call (743), and copies the hash to the XMM register pointed to by the counter (744).

Figure 28:
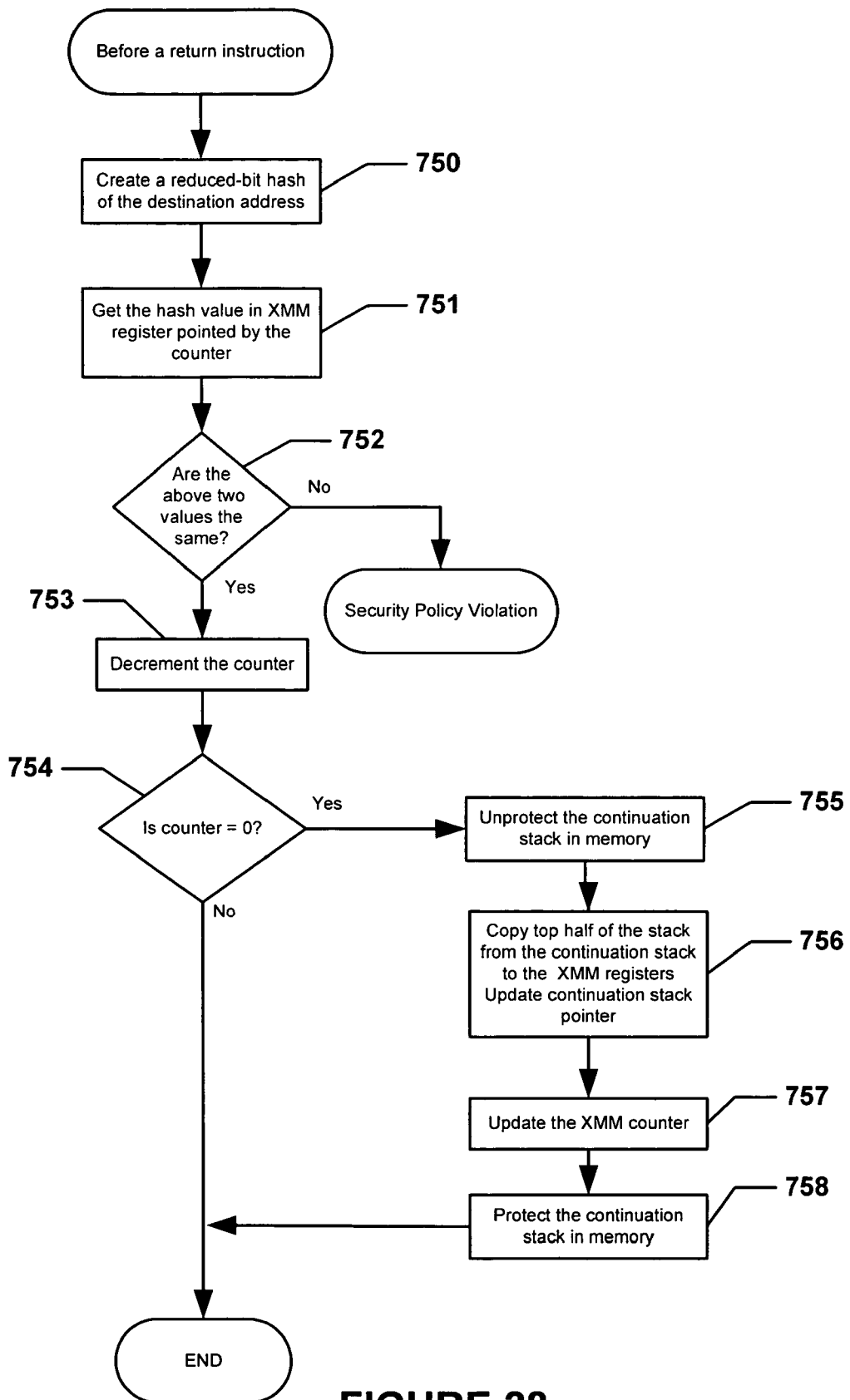
FIG. 28 is a flow chart further describing the shadow stack in the XMM registers in FIG. 27.

FIG. 28: XMM Return Protection with Buffer, Continued

FIG. 28 is a flow chart that describes the sandboxing operations of the return instruction, required to implement the return address protection described in FIG. 27. This figure continues XMM return protection with a buffer by describing the steps taken to validate the stack discipline at a return instruction.

Before a return instruction, the system creates a reduced-bit hash of the destination address (750), as described above, gets the value at the top of the XMM stack pointed at by the index register (751) and the compares the two (752). If they are not the same, there is a security violation. Getting the value at the top of the XMM stack (751) is done by using the value in the index as an offset into the XMM registers which is done by using a switch statement to handle the variable register addressing.

If they match, the system decrements the counter (753). If the XMM stack is empty, the counter will be zero (754). The system then needs to populate the XMM stack by getting values from the continuation stack in memory by doing the following:

Unprotect the continuation stack in memory, by changing the permissions on the containing page (755).
Copy the top of the continuation stack to the bottom half of the XMM registers and update the continuation stack pointer (756)
Update the index counter (757).
Protect the continuation stack in memory (758).

Figure 29:
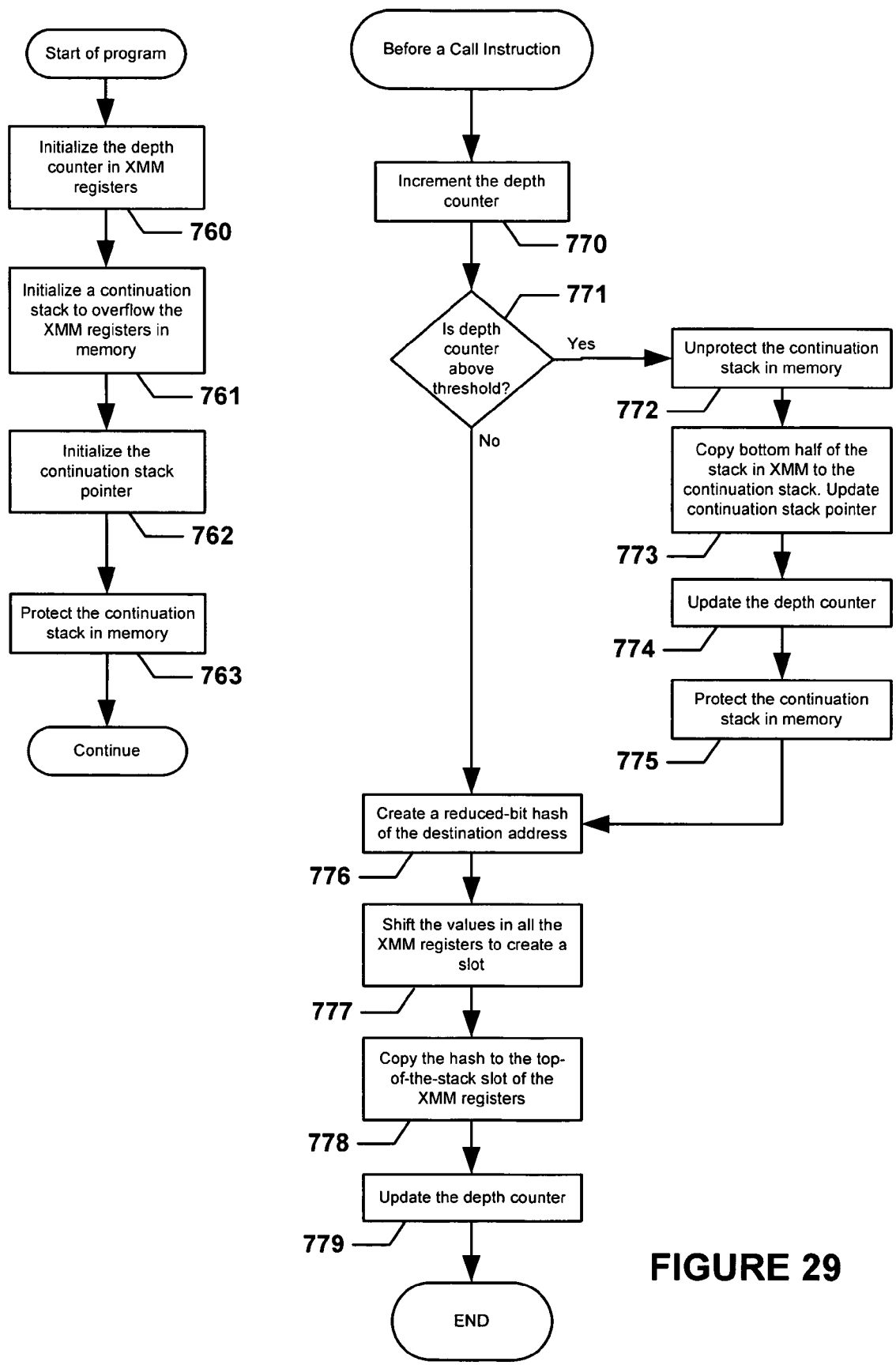
FIG. 29 is a flow chart describing Restricted Control Transfer stack discipline enforcement rule implemented using a shadow stack in the XMM registers as a shift register.

FIG. 29: Return Protection Using XMM Registers as a Shift Register

FIG. 29 includes flow charts that describe how to enforce the stack discipline using a separate continuation stack that is optimized using the XMM registers. The XMM registers are used as a shift register to store the top elements of the stack. The main difference between the embodiment described in FIGS. 27 and 28 and this embodiment is that here the XMM registers are used as a shift register. Thus, the top-of-the-stack is always at slot 0 in the XMM registers. This simplifies the code needed to push and pop values into the XMM stack. The final 16-bit slot is used to store the call depth, leaving room for 63 return address entries.

On a call, the slots are shifted over and the return address is stored in the first slot. When the call depth exceeds 63, the oldest 32 values are copied to a continuation stack in memory which is then protected. When the call depth reaches 0, the most recent stored values are swapped back into the first 32 register slots. Only copying half of the stack avoids thrashing due to a frequent series of small call depth changes. Expensive memory protection is only required on every call depth change of 32.

At the start of a program, the system initializes the call-depth counter in the XMM registers (760), initializes a continuation stack for saving the overflowed XMM registers in memory (761), initializes a stack pointer to the continuation stack (762) and finally protects the continuation stack in memory (763). Before a call instruction, the system increments the XMM call-depth counter (770) and if the counter is above a threshold (771), indicating that the XMM stack is full, the system does the following:

Unprotect the continuation stack in memory, using an unprotect system call to change the permissions of the page containing the stack (772).

Copy the bottom of the XMM stack to the continuation stack, which is done by a series of store operations of the individual XMM register values into the memory locations of the stack (773).

Update the call-depth counter to indicate that only half of the XMM registers have data (774).

Protect the continuation stack in memory (775).

In either case, the system creates a reduced-bit hash of the destination address, i.e., the address following the call (776), shifts all the values in the XMM registers to create an empty slot (777), copies the hash to the first slot in the XMM registers (778) and updates the depth counter (779).

Figure 30:
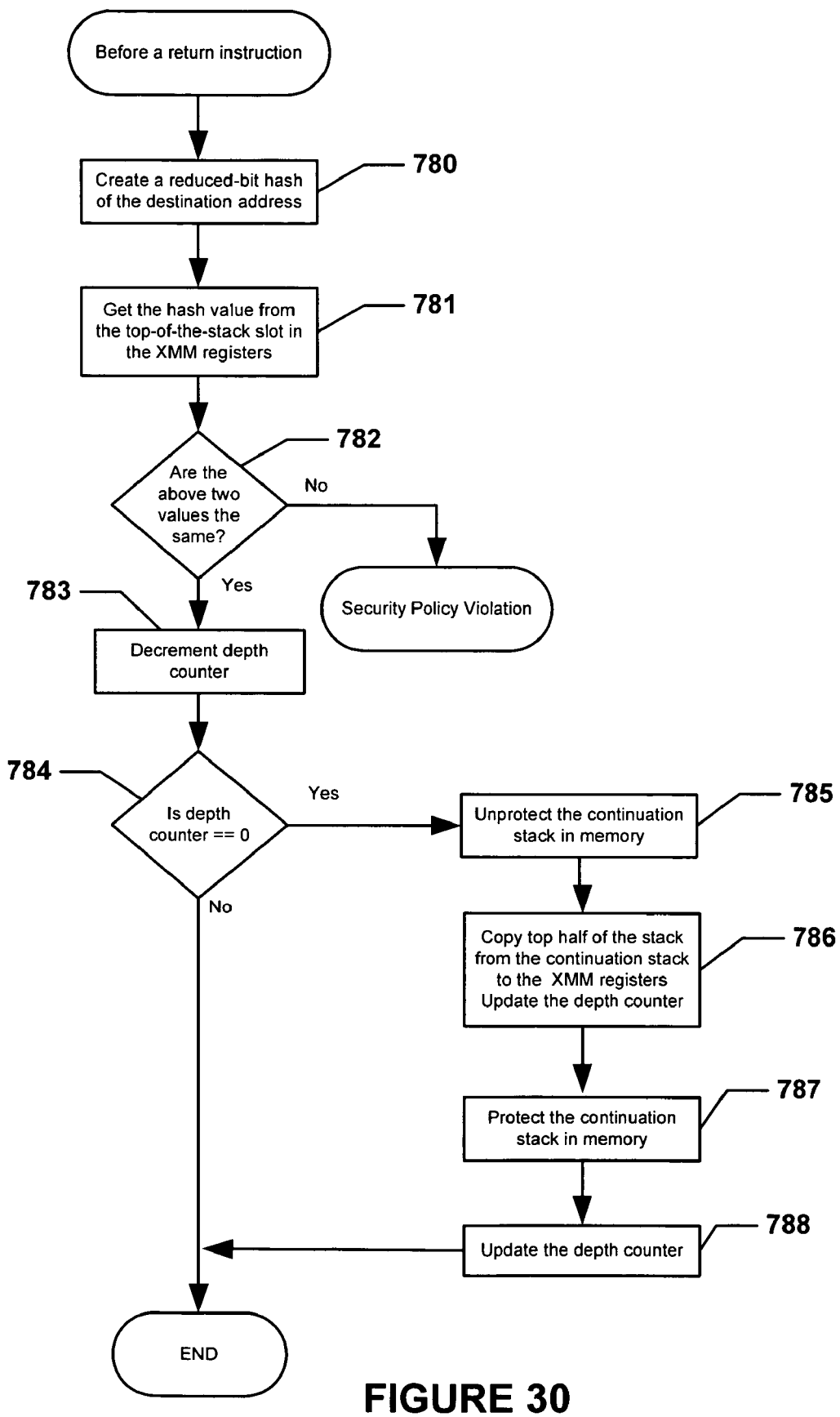
FIG. 30 is a flow chart further describing the shadow stack in the XMM registers in FIG. 29.

FIG. 30: XMM Return Protection with Shift Register, Continued

FIG. 30 is a flow chart that describes the steps taken to validate the stack discipline at a return instruction in order to enforce the return protection described in FIG. 29.

Before a return instruction, the system creates a reduced-bit hash of the destination address (780), as described above, gets the value at the top of the XMM stack (781) and then compares the two (782). If they are not the same, there is a security violation. If they match, the system decrements the call depth counter (783) and if it is zero (784), indicating that the XMM stack is empty, does the following:

Unprotect the continuation stack in memory, by changing the permissions on the containing page (785).

Copy the top of stack from the continuation stack to fill half of the XMM registers, and update the continuation stack pointer (786).

Protect the continuation stack in memory (787).

Update the XMM call-depth counter (788).

Figure 31:
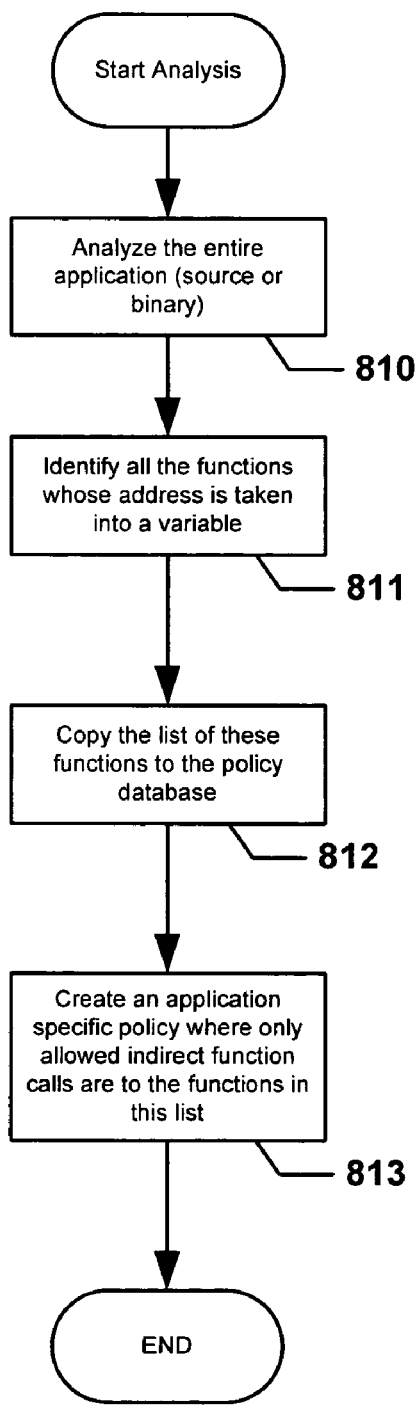
FIG. 31 is a flow chart describing function analysis in order to create an application-specific Restricted Control Transfer policy.

FIG. 31: Function Analysis

FIG. 31 is a flow chart that describes the steps taken by the analysis processor to create a simple application-specific policy. The degree of freedom of an attacker is given by the size of the set of allowed values for an attacked stored program address. Ideally, these sets should be singletons, because in a real program execution at any point there is only one valid value (in the absence of race conditions). Therefore, we aim to minimize the size of the sets and convert them to singletons when possible. Our first aim is to determine the points-to sets for function pointers by using an accurate static analysis. We use a flow-insensitive (to allow for concurrency) and context-insensitive analysis to gather the sets of valid targets for indirect calls. Using that information we construct the complete call graph for the program. Targets of return instructions are then computed from the graph, since the instructions after caller sites of a function constitute the only valid targets for its exit point.

Context-insensitive policies make an attacker's life much more difficult, narrowing potential attack targets from any instruction in the program to a small handful. The program's control flow graph and call graph can be enforced using only context-insensitive policies, as such graphs are themselves context-insensitive. However, the execution model is more than the control flow graph. For one thing, the model includes the calling convention, which restricts each return to have only one target (the return site of the caller), depending on the context.

Given the limit on execution models to those that disallow self-modifying code, direct control transfers will always perform as the program intends, as they are part of the code itself and cannot be modified by an attacker.

Indirect calls, indirect jumps, and returns obtain their targets from data, which can be modified by an attacker. Program shepherding allows arbitrary restrictions to be placed on control transfers in an efficient manner. Enforcing the execution model involves allowing each branch to jump only to a specified set of targets.

Static analyses produce context-insensitive policies, which can be easily enforced with minimal overhead. This is because context-insensitive policies are always valid after initial verification, and thus can be cached and cheaply evaluated with minimal execution overhead. Policies that only examine the target of a control flow transition are the cheapest, as a shared hash table per indirect transfer type can be used to look up the target for validation. Policies that need to examine both the source and the target of a transition can be made as efficient as only checking the target by using a separate hash table for each source location. The space drawback of this scheme is minor as equivalent target sets can be shared, and furthermore, the hash tables can be precomputed to be kept quite small without increase in access time.

Please refer to FIG. 31. Here the system analyzes the entire application via either source or binary (810) to identify all the functions whose address is taken into a variable (811). The variable referred to in (811) is a function pointer because it holds function addresses. The set of functions whose address is taken into a particular variable is termed as the "points to set" for the function pointer. Such analysis is well-known in the art. In this case the approach taken is even simpler since all these function addresses are consolidated into a single list. Then those function addresses on the list are the only ones that can be legally called. The system copies the list of these legal function addresses to the policy database (812) and creates an application-specific policy where the only allowed indirect function calls are to the functions in this list (813).

Figure 32:
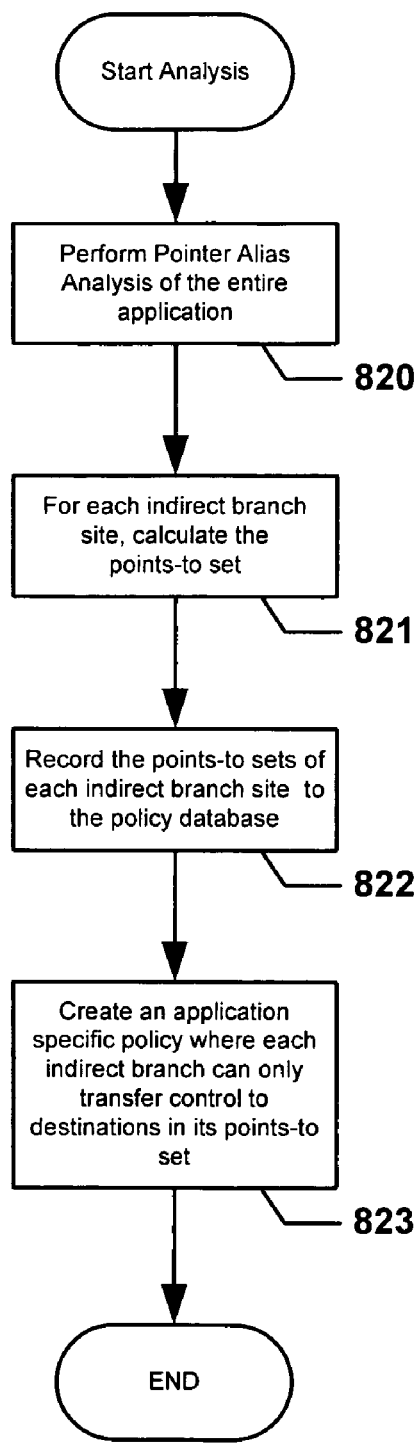
FIG. 32 is a flow chart describing branch analysis in order to create an application-specific Restricted Control Transfer policy.

FIG. 32: Branch Analysis

FIG. 32 is a flow chart that describes the steps taken by the analysis processor to create a more fine-grained application-specific policy than that described in FIG. 31.

First, the system performs Pointer Alias Analysis of the entire application (820). This is also well-known in the art [L. O. Andersen, "Program Analysis and Specialization for the C Programming Language", PhD thesis, DIKU, University of Copenhagen, May 1994, DIKU report 94/19]. It allows the system to get an accurate list of which functions a particular function pointer can reference. Aliasing is a well-known concept that arises because different pointers can refer to the same memory locations. For each indirect branch site, the system calculates the points-to set (821). The alias analysis provides a safe determination, that is as accurate as possible, of the points-to set for each call site. The system records the points-to sets of each indirect branch site to the policy database (822) and creates an application-specific policy where each indirect branch can only transfer control to destinations in its points-to set (823).

Figure 33:
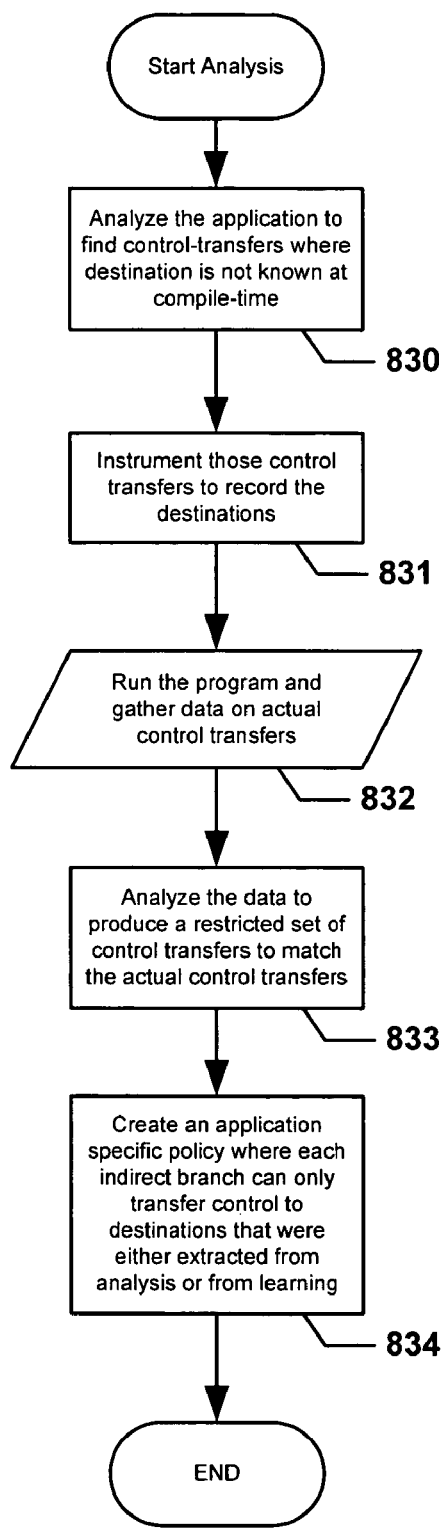
FIG. 33 is a flow chart describing branch instrumentation and gathering of runtime profile information in order to create an application-specific Restricted Control Transfer policy.

FIG. 33: Branch Profiling

FIG. 33 is a flow chart that describes how to use profile information in order to create an application-specific security policy. An easy way to obtain the target sets for a flow-insensitive, context-insensitive validation in the program shepherding system is to first run it in "learning" mode to collect indirect transition information, and then use the results of such learning runs and allow only those transitions. However, it is prone to false positives unless profiling runs have very high code coverage.

The system analyzes the application to find those control transfers where the destination is not known at compile time (830). It then instruments those control transfers to record the destinations at runtime (831). The system runs the program and gathers the data on actual control transfer targets (832). It analyzes the data to produce a restricted set of control transfers to match the actual control transfers (833) and creates an application-specific policy where each indirect branch can only transfer control to destinations that were either extracted from analysis or learning (834).

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A method for securing a computing system, comprising:
monitoring a program whose loaded program code comprises instructions that are loaded into memory of the computing system; and
using a code cache to enforce a security policy on said program, the step of using includes:
  determining compliance of the instructions with the security policy;
  copying the instructions from the loaded program code into the code cache after the instructions are determined to comply with the security policy; and
  modifying instructions of the program which represent control transfers to ensure that the control transfers of the program comply with the security policy, and to ensure that the program is executed from the code cache instead of from the loaded program code.

2. A method according to claim 1, wherein:
the instructions comprise trusted code which is executed only from the code cache with no security overhead.

3. A method according to claim 1, wherein the instructions are provided in blocks and/or fragments of the program, the method further comprising:
building the blocks and/or fragments of the program responsive to the monitoring, and based on destination addresses of the control transfers of the program.

4. A method according to claim 1, wherein:
the step of using includes enforcing the security policy during potential linking of the instructions to one another in the code cache.

5. A method according to claim 1, wherein:
the step of using includes restricting execution privileges based on code origins of the instructions.

6. A method according to claim 5, wherein:
the restricting execution privileges based on code origins includes performing a code origins check whenever the instructions are copied into the code cache.

7. A method according to claim 5, wherein:
the instructions are provided in blocks and/or fragments of the program; and
the restricting execution privileges based on code origins includes performing a code origins check only once for each block and/or fragment when that block and/or fragment is copied into the code cache, so that after the code origins check is performed only once, future executions of the each block and/or fragment from the code cache proceed without further code origins checks of the each block and/or fragment.

8. A method according to claim 1, further comprising:
determining if a particular control transfer violates the security policy; and
allowing the particular control transfer within the code cache only if the particular control transfer does not violate the security policy.

9. A method according to claim 1, wherein:
the step of using includes preventing bypass of sandboxing checks placed around the instructions in the code cache.

10. A method according to claim 9, wherein:
the instructions are provided in blocks and/or fragments of the program; and
the preventing bypass of sandboxing checks includes only allowing control transfers to tops of the blocks and/or fragments in the code cache.

11. A method according to claim 9, wherein:
the instructions are provided in blocks and/or fragments; and
the preventing bypass of sandboxing checks includes inserting pre and post checks when an instruction that needs to be sandboxed is copied to the code cache and arranging the code cache such that control transfers within the code cache go to a first instruction only for each block and/or fragment of code in the code cache.

12. A method according to claim 1, wherein:
after determining compliance with the security policy, future executions of the instructions from the code cache proceed without further security checks of the instructions.

13. A method according to claim 1, wherein:
the monitoring monitors all control transfers of the program, and the code cache is used to enforce the security policy on the all control transfers.

14. A method according to claim 1, wherein:
the monitoring monitors function calls of the program, and the code cache is used to enforce the security policy on the function calls.

15. A method according to claim 1, wherein:
the monitoring monitors branch instructions of the program, and the code cache is used to enforce the security policy on the branch instructions.

16. A method according to claim 1, wherein:
the monitoring monitors return instructions of the program, and the code cache is used to enforce the security policy on the return instructions.

17. A method according to claim 1, wherein:
the program is provided in units of modules, and the security policy is enforced for control transfers within a module of the program.

18. A method according to claim 1, wherein:
the security policy is enforced for indirect control transfers of the program.

19. A method according to claim 1, wherein:
the instructions are provided in blocks and/or fragments of the program; and
the step of using includes enforcing the security policy for each potential linking of the blocks and/or fragments to one another in the code cache, so that if a direct branch between two blocks and/or fragments is allowed by the security policy, the direct branch becomes a direct jump with no security overhead, and if the direct branch is not allowed by the security policy, the direct branch is linked to a routine that announces or handles a security violation.

20. A method according to claim 5, further comprising: checking a code origin of each instruction against the security policy, and determining if execution privileges of each instruction should be restricted based on the checking.

21. A method according to claim 1, wherein: the program comprises basic blocks which are built and copied into the code cache, one after another.

22. A method according to claim 1, further comprising: instrumenting the program, the monitoring of the program is responsive to the instrumenting.

23. A method according to claim 1, wherein the control transfers include a direct control transfer for which a target address is known before the program runs, the method further comprising:
modifying the target address in the code cache to refer to a copy of a particular block and/or fragment in the code cache, the particular block and/or fragment is located for executing using the modified target address.

24. A method according to claim 1, wherein the control transfers include an indirect control transfer for which a target address is not known until the program runs, the method further comprising:
accessing a lookup table using the target address to obtain a new address of a copy of a particular block and/or fragment in the code cache, the particular block and/or fragment is located for executing using the new address.

25. A method according to claim 1, further comprising: responsive to the monitoring, building a trace which comprises a sequence of blocks and/or fragments of the instructions, the sequence is executed from the code cache without switching from the context of the executing.

26. A method according to claim 1, wherein: the instructions of the program which represent control transfers are modified before being copied into the code cache.

27. A method according to claim 1, further comprising: adding instructions to the program to ensure that the control transfers of the program comply with the security policy, and to ensure that the program is executed from the code cache instead of from the loaded program code.

28. A method according to claim 1, wherein: the modifying comprises modifying at least one of the instructions of the program which represents a control transfer, in order to transfer control from a context of the program to a context of a monitoring program which implements the security policy.

29. A method according to claim 1, further comprising: determining a next valid instruction of the program to execute after a particular instruction of the program is executed.

30. A method according to claim 1, wherein: the code cache is a software code cache.

31. A method according to claim 1, further comprising: adding instructions to the program to perform the determining, copying and modifying.

32. An apparatus for securing a computing system, comprising:
means for monitoring control flow transfers for a program whose loaded program code comprises instructions that are loaded into memory of the computing system; and
means, responsive to the means for monitoring, for using a code cache to enforce a security policy on the control flow transfers by:
determining compliance of the instructions with the security policy;
copying the instructions from the loaded program code into the code cache after the instructions are determined to comply with the security policy; and
modifying instructions of the program which represent control transfers to ensure that the control transfers of the program comply with the security policy, and to ensure that the program is executed from the code cache instead of from the loaded program code.

33. An apparatus for securing a computing system, comprising:
a processor readable storage device, the processor readable storage device includes a code cache; and
a processor in communication with the processor readable storage device, the processor performs a method comprising:
monitoring a program whose loaded program code comprises instructions that are loaded into memory of the computing system; and
responsive to the monitoring, enforcing a security policy on the program by:
determining compliance of the instructions with the security policy;
copying the instructions from the loaded program code into the code cache after the instructions are determined to comply with the security policy; and
modifying instructions of the program which represent control transfers to ensure that the control transfers of the program comply with the security policy, and to ensure that the program is executed from the code cache instead of from the loaded program code.

34. An apparatus according to claim 33, wherein: the enforcing includes restricting execution privileges based on code origins of the instructions.

35. An apparatus according to claim 33, wherein: the enforcing includes restricting control transfers for the instructions.

36. An apparatus according to claim 35, wherein: the restricting control transfers includes allowing a source of a particular control transfer to directly branch to a destination within the code cache only if the particular control transfer does not violate the security policy.

37. An apparatus according to claim 33, wherein: the enforcing includes preventing bypass of sandboxing checks placed around the instructions in the code cache.

38. An apparatus according to claim 37, wherein: the instructions are provided in basic blocks; and
the preventing bypass of sandboxing checks includes only allowing control flow transfers to tops of basic blocks and/or traces, which comprise groups of basic blocks, in the code cache.

39. An apparatus according to claim 37, wherein: the instructions are provided in blocks and/or fragments; and
the preventing bypass of sandboxing checks includes inserting pre and post checks when an instruction that needs to be sandboxed is copied to the code cache and arranging the code cache such that control transfers within the code cache go to a first instruction of the blocks and/or fragments in the code cache.

* * * * *

UNITED STATES PATENT AND TRADEMARK OFFICE
CERTIFICATE OF CORRECTION

PATENT NO. : 7,603,704 B2  Page 1 of 1
APPLICATION NO. : 10/739499
DATED : October 13, 2009
INVENTOR(S) : Bruening et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 625 days.

Signed and Sealed this

Fifth Day of October, 2010

David J. Kappos
*Director of the United States Patent and Trademark Office*